United States Patent
Hunzinger et al.

(10) Patent No.: US 9,275,329 B2
(45) Date of Patent: Mar. 1, 2016

(54) BEHAVIORAL HOMEOSTASIS IN ARTIFICIAL NERVOUS SYSTEMS USING DYNAMICAL SPIKING NEURON MODELS

(71) Applicant: QUALCOMM Incorporated, San Diego, CA (US)

(72) Inventors: Jason Frank Hunzinger, Escondido, CA (US); Victor Hokkiu Chan, Del Mar, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 278 days.

(21) Appl. No.: 14/167,727

(22) Filed: Jan. 29, 2014

(65) Prior Publication Data

US 2015/0046383 A1    Feb. 12, 2015

Related U.S. Application Data

(60) Provisional application No. 61/864,794, filed on Aug. 12, 2013.

(51) Int. Cl.
| | |
|---|---|
| *G06F 15/18* | (2006.01) |
| *G06N 3/08* | (2006.01) |
| *G06N 3/04* | (2006.01) |

(52) U.S. Cl.
CPC ..................................... *G06N 3/049* (2013.01)

(58) Field of Classification Search
None
See application file for complete search history.

(56) References Cited

U.S. PATENT DOCUMENTS

| | | | |
|---|---|---|---|
| 7,430,546 B1 | 9/2008 | Suri | |
| 7,979,370 B1 | 7/2011 | Ershov | |
| 8,706,662 B2 * | 4/2014 | Chan | G06N 3/063 706/15 |
| 8,909,575 B2 * | 12/2014 | Hunzinger | G06N 3/08 706/25 |
| 9,002,760 B2 * | 4/2015 | Lai | G06N 3/049 706/14 |
| 9,015,091 B2 * | 4/2015 | Hunzinger | G06N 3/049 706/25 |
| 9,015,096 B2 * | 4/2015 | Hunzinger | G06N 3/049 706/45 |
| 9,053,428 B2 * | 6/2015 | Hunzinger | G06N 3/049 |
| 9,064,215 B2 * | 6/2015 | Hunzinger | G06N 3/08 |
| 9,092,735 B2 * | 7/2015 | Hunzinger | G06N 3/049 |
| 9,111,224 B2 * | 8/2015 | Hunzinger | G06N 3/088 |

(Continued)

OTHER PUBLICATIONS

A subthreshold aVLSI implementation of the Izhikevich simple neuron model Rangan, V.; Ghosh, A.; Aparin, V.; Cauwenberghs, G. Engineering in Medicine and Biology Society (EMBC), 2010 Annual International Conference of the IEEE Year: 2010 pp. 4164-4167, DOI: 10.1109/IEMBS.2010.5627392 IEEE Conference Publications.*

(Continued)

*Primary Examiner* — Michael B Holmes
(74) *Attorney, Agent, or Firm* — Patterson & Sheridan, L.L.P.

(57) ABSTRACT

Methods and apparatus are provided for implementing behavioral homeostasis in artificial neurons that use a dynamical spiking neuron model. The homeostatic mechanism may be driven by neuron state, rather than by neuron spiking rate, and this mechanism may drive changes to the neuron temporal dynamics, rather than to contributions of input or weights. As a result, certain aspects of the present disclosure are a more natural fit with spiking neural networks and have many functional and computational advantages. One example method for implementing homeostasis of an artificial nervous system generally includes determining one or more state variables of a neuron model used by an artificial neuron, based at least in part on dynamics of the neuron model; determining one or more conditions based at least in part on the state variables; and adjusting the dynamics based at least in part on the conditions.

38 Claims, 16 Drawing Sheets

(56) References Cited

U.S. PATENT DOCUMENTS

| | | | | |
|---|---|---|---|---|
| 9,111,225 | B2* | 8/2015 | Hunzinger | G06N 3/049 |
| 9,147,155 | B2* | 9/2015 | Chan | G06N 3/088 |
| 9,177,245 | B2* | 11/2015 | Richert | G06N 3/08 |
| 9,208,431 | B2* | 12/2015 | Hunzinger | G06N 3/049 |
| 2010/0312736 | A1 | 12/2010 | Kello et al. | |
| 2011/0035215 | A1 | 2/2011 | Sompolinsky et al. | |
| 2013/0024409 | A1 | 1/2013 | Hunzinger et al. | |
| 2013/0024410 | A1 | 1/2013 | Chan et al. | |
| 2013/0204819 | A1 | 8/2013 | Hunzinger et al. | |

OTHER PUBLICATIONS

Estimation of Hidden State Variables of the Intracranial System Using Constrained Nonlinear Kalman Filters Xiao Hu; Nenov, V.; Bergsneider, M.; Glenn, T.C.; Vespa, P.; Martin, N. Biomedical Engineering, IEEE Transactions on Year: 2007, vol. 54, Issue: 4 pp. 597-610, DOI: 10.1109/TBME.2006.890130 IEEE Journals & Magazines.*

Internal states of pulse-type hardware neuron model with chaotic dynamics Someya, K.; Shinozaki, H.; Miyata, E.; Sekine, Y. Neural Networks, 1996., IEEE International Conference on Year: 1996, vol. 2 pp. 846-851 vol. 2, DOI: 10.1109/ICNN.1996.549007 IEEE Conference Publications.*

Multiphysics Neuron Model for Cellular Volume Dynamics Jonghwan Lee; Boas, D.A.; Sung June Kim Biomedical Engineering, IEEE Transactions on Year: 2011, vol. 58, Issue: 10 pp. 3000-3003, DOI: 10.1109/TBME.2011.2159217 IEEE Journals & Magazines.*

Abbott L.F., "Balancing homeostasis and learning in neural circuits", Zoology, Elsevier, Amsterdam, NL, vol. 106, No. 4, XP004956539, ISSN: 0944-2006, DOI: 10.1078/0944-2006-00133, Jan. 1, 2003, pp. 365-371.

Alanna J. Watt: "Homeostatic plasticity and STDP: keeping a neuron's cool in a fluctuating world", Frontiers in Synaptic Neuroscience, vol. 2, Jan. 1, 2010, XP055177860, pp. 1-13, ISSN: 1663-3563, DOI: 10.3389/fnsyn.2010.00005.

Carlson Kristofor D et al: "Biologically Plausible Models of Homeostasis and STDP: Stability and Learning in Spiking Neural Networks", The 2013 International Joint Conference on Neural Networks (IJCNN), IEEE, Aug. 4, 2013, XP032542156, pp. 1-8, ISSN: 2161-4393, DOI: 10.1109/IJCNN.2013.6706961.

International Search Report and Written Opinion—PCT/US2014/048589—ISA/EPO—Mar. 31, 2015.

Morrison A., et al., "Phenomenological models of synaptic plasticity based on spike timing," Biological Cybernetics, vol. 98, No. 6, Apr. 9, 2008, pp. 459-478, XP019630139, D0I: 10.1007/S00422-008-0233-1 Section 4.1.3.

* cited by examiner

BEHAVIORAL HOMEOSTASIS IN ARTIFICIAL NERVOUS SYSTEMS USING DYNAMICAL SPIKING NEURON MODELS

CLAIM OF PRIORITY UNDER 35 U.S.C. §119

This application claims benefit of U.S. Provisional Patent Application Ser. No. 61/864,794, filed Aug. 12, 2013 and entitled "Behavioral Homeostasis in Artificial Nervous Systems Using Dynamical Spiking Neuron Models," which is herein incorporated by reference in its entirety.

BACKGROUND

1. Field

Certain aspects of the present disclosure generally relate to artificial nervous systems and, more particularly, to implementing behavioral homeostasis in an artificial nervous system that employs dynamical spiking neuron models.

2. Background

An artificial neural network, which may comprise an interconnected group of artificial neurons (i.e., neural processing units), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

One type of artificial neural network is the spiking neural network, which incorporates the concept of time into its operating model, as well as neuronal and synaptic state, thereby providing a rich set of behaviors from which computational function can emerge in the neural network. Spiking neural networks are based on the concept that neurons fire or "spike" at a particular time or times based on the state of the neuron, and that the time is important to neuron function. When a neuron fires, it generates a spike that travels to other neurons, which, in turn, may adjust their states based on the time this spike is received. In other words, information may be encoded in the relative or absolute timing of spikes in the neural network.

SUMMARY

Certain aspects of the present disclosure generally relate to implementing behavioral homeostasis in an artificial nervous system composed of artificial neurons that use a dynamical spiking neuron model. According to certain aspects, the homeostatic mechanism described herein is driven by neuron state, rather than by neuron spiking rate as in conventional systems with homeostasis. Furthermore, the homeostatic mechanism described herein for certain aspects drives changes to the neuron temporal dynamics, rather than to the contribution of inputs or weights.

Certain aspects of the present disclosure provide a method for implementing homeostasis of an artificial nervous system. The method generally includes determining one or more state variables of a neuron model used by an artificial neuron, based at least in part on dynamics of the neuron model, determining one or more conditions based at least in part on the state variables, and adjusting the dynamics based at least in part on the conditions.

Certain aspects of the present disclosure provide an apparatus for implementing homeostasis of an artificial nervous system. The apparatus generally includes a processing system and a memory coupled to the processing system. The processing system is typically configured to determine one or more state variables of a neuron model used by an artificial neuron, based at least in part on dynamics of the neuron model, to determine one or more conditions based at least in part on the state variables, and to adjust the dynamics of the neuron model based at least in part on the conditions.

Certain aspects of the present disclosure provide an apparatus for implementing homeostasis of an artificial nervous system. The apparatus generally includes means for determining one or more state variables of a neuron model used by an artificial neuron, based at least in part on dynamics of the neuron model, means for determining one or more conditions based at least in part on the state variables, and means for adjusting the dynamics based at least in part on the conditions.

Certain aspects of the present disclosure provide a computer program product for implementing homeostasis of an artificial nervous system. The computer program product generally includes a non-transitory computer-readable medium (e.g., a storage device) having instructions executable to determine one or more state variables of a neuron model used by an artificial neuron, based at least in part on dynamics of the neuron model, to determine one or more conditions based at least in part on the state variables, and to adjust the dynamics based at least in part on the conditions.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
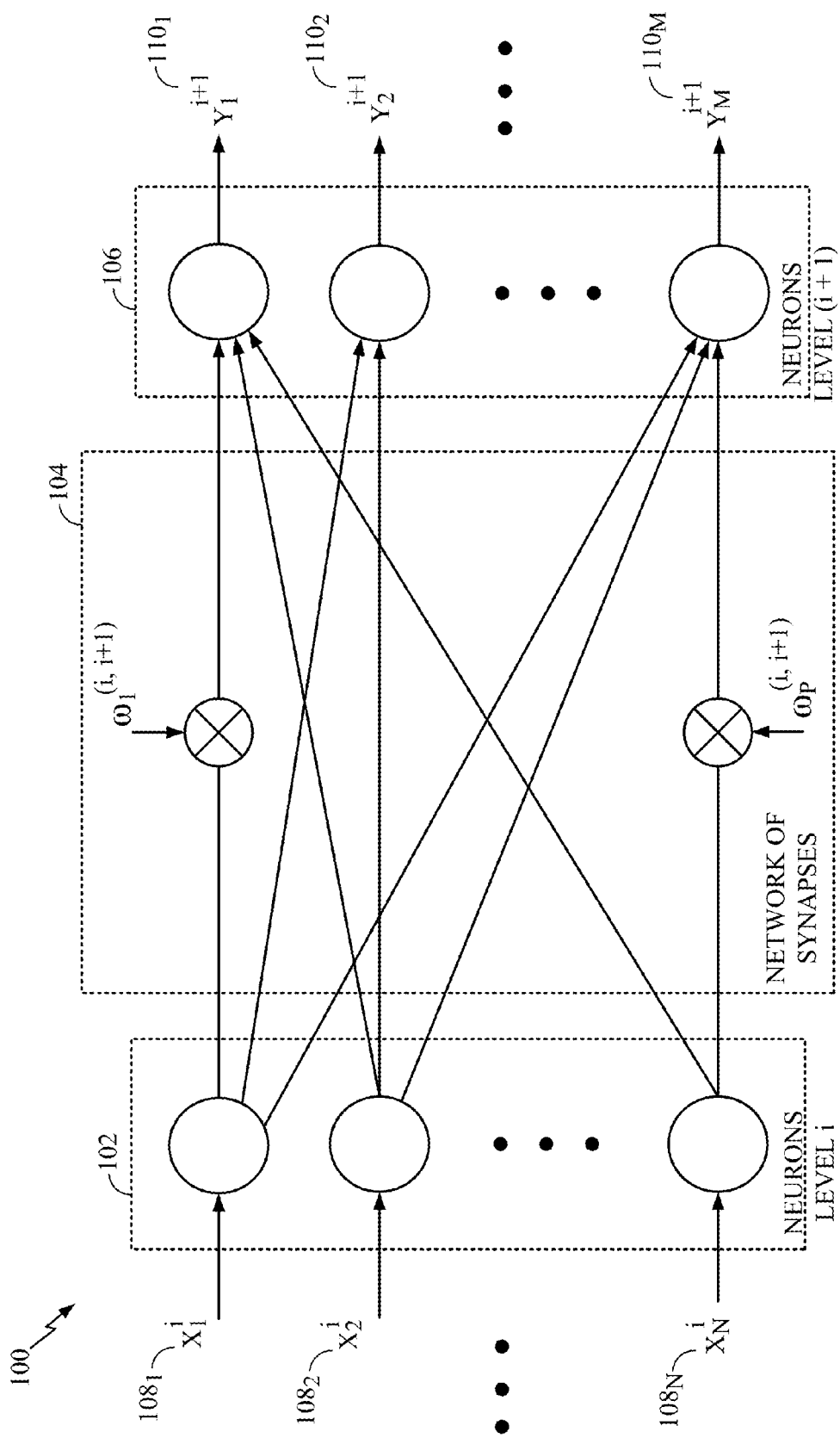
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104 (i.e., feed-forward connections). For simplicity, only two levels of neurons are illustrated in FIG. 1, although fewer or more levels of neurons may exist in a typical neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations.

In biological neurons, the output spike generated when a neuron fires is referred to as an action potential. This electrical signal is a relatively rapid, transient, all-or nothing nerve impulse, having an amplitude of roughly 100 mV and a duration of about 1 ms. In a particular aspect of a neural system having a series of connected neurons (e.g., the transfer of spikes from one level of neurons to another in FIG. 1), every action potential has basically the same amplitude and duration, and thus, the information in the signal is represented only by the frequency and number of spikes (or the time of spikes), not by the amplitude. The information carried by an action potential is determined by the spike, the neuron that spiked, and the time of the spike relative to one or more other spikes.

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals typically depolarize the membrane potential (i.e., increase the membrane potential with respect to the resting potential). If enough excitatory signals are received within a certain period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching threshold. In addition to counteracting synaptic excitation, synaptic inhibition can exert powerful control over spontaneously active neurons. A spontaneously active neuron refers to a neuron that spikes without further input, for example, due to its dynamics or feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and the like. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, wherein a particular functionality may be based on synaptic weights stored in a memory card currently attached to the neural processor.

Figure 2:
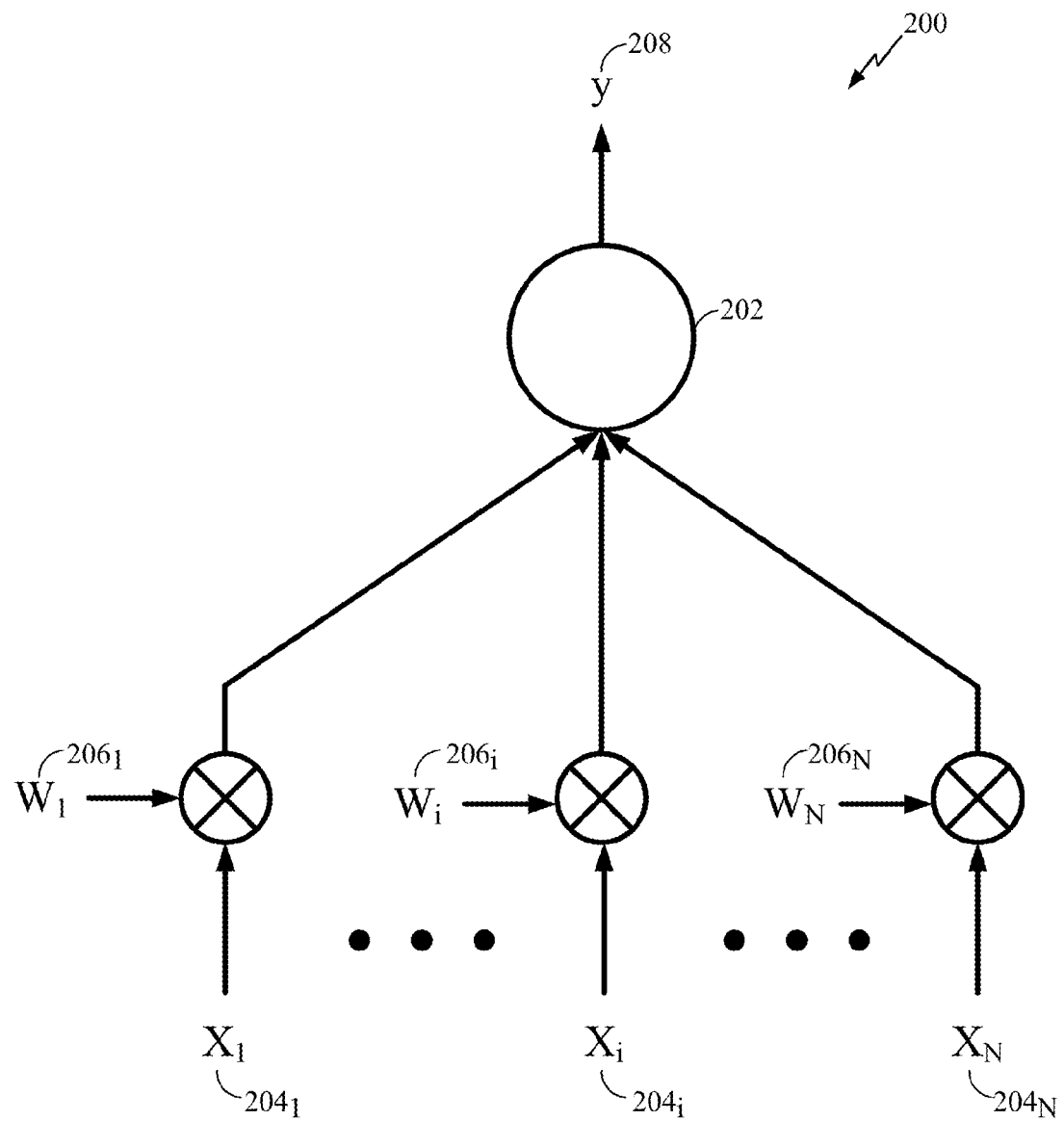
FIG. 2 illustrates an example processing unit (neuron) of a computational network (neural system or neural network), in accordance with certain aspects of the present disclosure.

FIG. 2 illustrates an example 200 of a processing unit (e.g., an artificial neuron 202) of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($x_1$-$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights 206$_1$-206N ($w_1$-$w_N$), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron 202) may be emulated by an electrical circuit, and its input and output connections may be emulated by wires with synaptic circuits. The processing unit, its input and output connections may also be emulated by a software code. The processing unit may also be emulated by an electric circuit, whereas its input and output connections may be emulated by a software code. In an aspect, the processing unit in the computational network may comprise an analog electrical circuit. In another aspect, the processing unit may comprise a digital electrical circuit. In yet another aspect, the processing unit may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights 206$_1$-206$_N$ from FIG. 2) may be initialized with random values and increased or decreased according to a learning rule. Some examples of the learning rule are the spike-timing-dependent plasticity (STDP) learning rule, the Hebb rule, the Oja rule, the Bienenstock-Copper-Munro (BCM) rule, etc. Very often, the weights may settle to one of two values (i.e., a bimodal distribution of weights). This effect can be utilized to reduce the number of bits per synaptic weight, increase the speed of reading and writing from/to a memory storing the synaptic weights, and to reduce power consumption of the synaptic memory.

Synapse Type

In hardware and software models of neural networks, processing of synapse related functions can be based on synaptic type. Synapse types may comprise non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of this is that processing can be subdivided. For example, non-plastic synapses may not require plasticity functions to be executed (or waiting for such functions to complete). Similarly, delay and weight plasticity may be subdivided into operations that may operate in together or separately, in sequence or in parallel. Different types of synapses may have different lookup tables or formulas and parameters for each of the different plasticity types that apply. Thus, the methods would access the relevant tables for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) since structural plasticity (i.e., an amount of delay change) may be a direct function of pre-post spike time difference. Alternatively, it may be set as a function of the weight change amount or based on conditions relating to bounds of the weights or weight changes. For example, a synaptic delay may change only when a weight change occurs or if weights reach zero, but not if the weights are maxed out. However, it can be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as to computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity, and homeostatic plasticity.

STDP is a learning process that adjusts the strength of synaptic connections between neurons, such as those in the brain. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. In contrast, long-term depression (LTD) may occur if an input spike tends, on average, to occur immediately after an output spike. Then, that particular input is made somewhat weaker, hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to zero or near zero.

Since a neuron generally produces an output spike when many of its inputs occur within a brief period (i.e., being sufficiently cumulative to cause the output), the subset of inputs that typically remains includes those that tended to be correlated in time. In addition, since the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by, $$\Delta w(t) = \begin{cases} a_+ e^{-t/k_+} + \mu, & t > 0 \\ a_- e^{t/k_-}, & t < 0 \end{cases}, \quad (1)$$

where $k_+$ and $k_-$ are time constants for positive and negative time difference, respectively, $a_+$ and $a_-$ are corresponding scaling magnitudes, and $\mu$ is an offset that may be applied to the positive time difference and/or the negative time difference.

Figure 3:
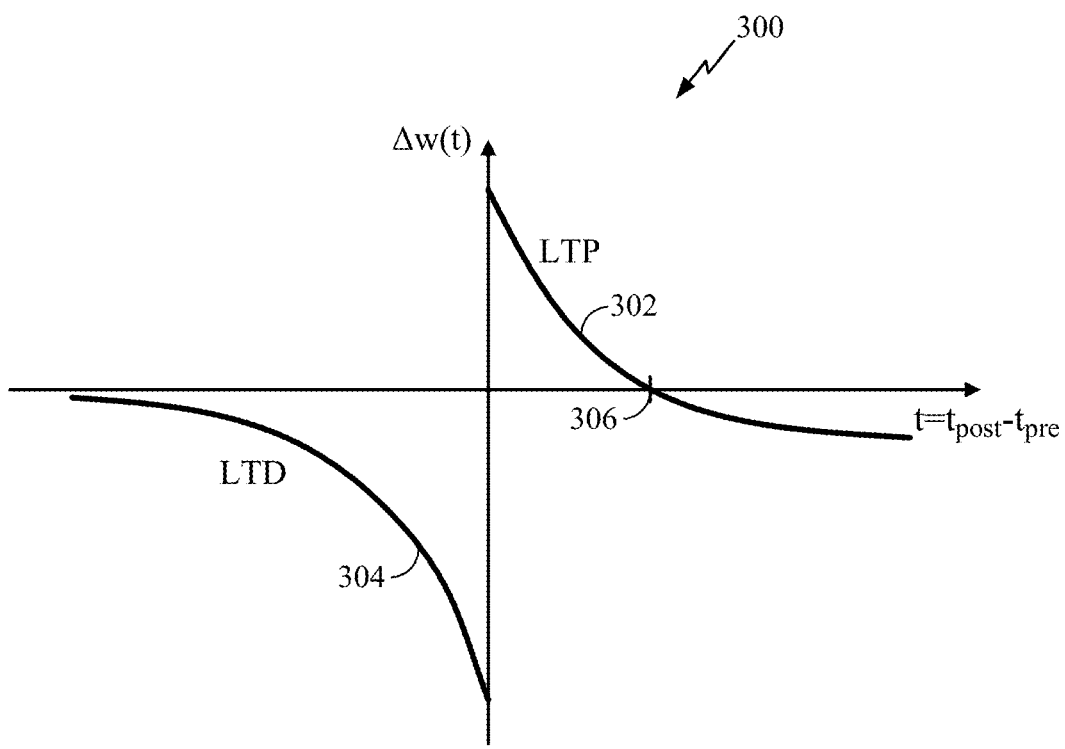
FIG. 3 illustrates an example spike-timing dependent plasticity (STDP) curve in accordance with certain aspects of the present disclosure.

FIG. 3 illustrates an example graph 300 of a synaptic weight change as a function of relative timing of pre-synaptic and post-synaptic spikes in accordance with STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1 (presynaptic layer). In the case of a frame-based input (i.e., an input is in the form of a frame of a particular duration comprising spikes or pulses), the offset value $\mu$ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant of a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and have stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any) can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics, $$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e., $$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in biologically-consistent linear fashion. The time constant in the supra-threshold regime, positive by convention, reflects anti-leaky channel dynamics generally driving a cell to spike while incurring latency in spike-generation.

Figure 4:
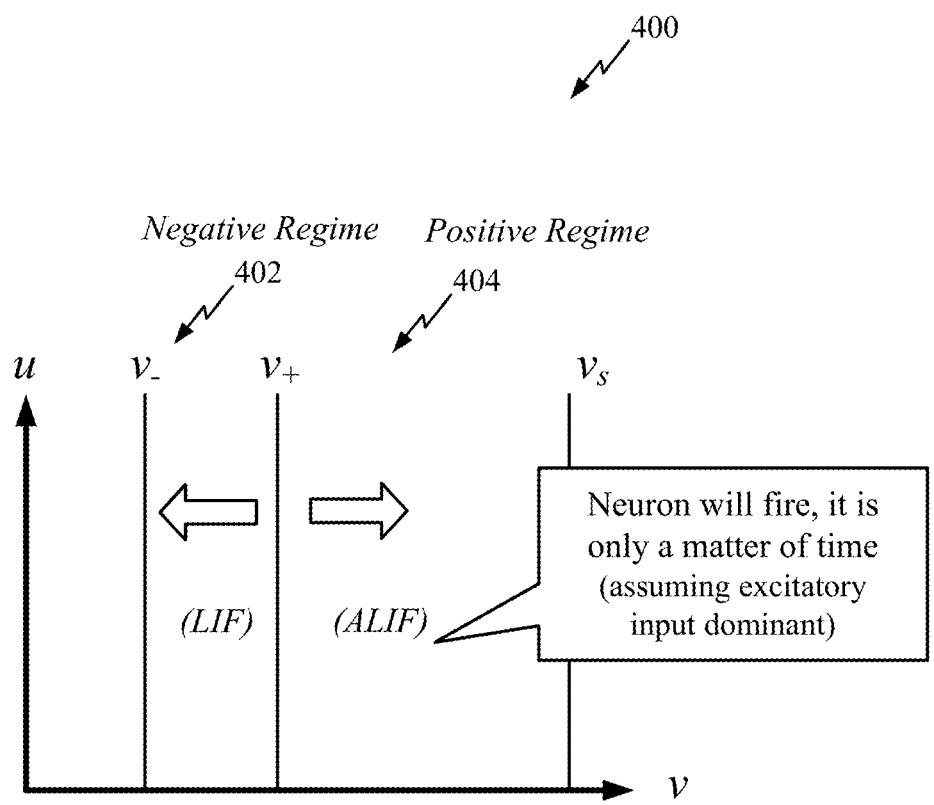
FIG. 4 is an example graph of state for an artificial neuron, illustrating a positive regime and a negative regime for defining behavior of the neuron, in accordance with certain aspects of the present disclosure.

As illustrated in FIG. 4, the dynamics of the model may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime two-dimensional dynamics (for states v and u) may be defined by convention as, $$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are $$q_\rho = -\tau_\rho \beta u - v_\rho \quad (7)$$

$$r = \delta(v + \epsilon) \quad (8)$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter $\delta$ is a scale factor controlling the slope of the u null-cline. The parameter $\epsilon$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model is defined to spike when the voltage v reaches a value $v_S$. Subsequently, the state is typically reset at a reset event (which technically may be one and the same as the spike event):

$$v = \hat{v}_- \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed-form solution is possible not only for state (and with a single exponential term), but also for the time required to reach a particular state. The closed-form state solutions are $$v(t + \Delta t) = (v(t) + q_\rho)e^{\frac{\Delta t}{\tau_\rho}} - q_\rho \quad (11)$$

$$u(t + \Delta t) = (u(t) + r)e^{-\frac{\Delta t}{\tau_u}} - r \quad (12)$$

Therefore, the model state may be updated only upon events, such as upon an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by $$\Delta t = \tau_\rho \log \frac{v_f + q_\rho}{v_0 + q_\rho} \quad (13)$$

If a spike is defined as occurring at the time the voltage state v reaches $v_S$, then the closed-form solution for the amount of time, or relative delay, until a spike occurs as measured from the time that the voltage is at a given state v is $$\Delta t_S = \begin{cases} \tau_+ \log \frac{v_S + q_+}{v + q_+} & \text{if } v > \hat{v}_+ \\ \infty & \text{otherwise} \end{cases} \quad (14)$$

where $\hat{v}_+$ is typically set to parameter $v_+$, although other variations may be possible.

The above definitions of the model dynamics depend on whether the model is in the positive or negative regime. As mentioned, the coupling and the regime $\rho$ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Neural Coding

A useful neural network model, such as one composed of the artificial neurons 102, 106 of FIG. 1, may encode information via any of various suitable neural coding schemes, such as coincidence coding, temporal coding or rate coding. In coincidence coding, information is encoded in the coincidence (or temporal proximity) of action potentials (spiking activity) of a neuron population. In temporal coding, a neuron encodes information through the precise timing of action potentials (i.e., spikes) whether in absolute time or relative time. Information may thus be encoded in the relative timing of spikes among a population of neurons. In contrast, rate coding involves coding the neural information in the firing rate or population firing rate.

If a neuron model can perform temporal coding, then it can also perform rate coding (since rate is just a function of timing or inter-spike intervals). To provide for temporal coding, a good neuron model should have two elements: (1) arrival time of inputs affects output time; and (2) coincidence detection can have a narrow time window. Connection delays provide one means to expand coincidence detection to temporal pattern decoding because by appropriately delaying elements of a temporal pattern, the elements may be brought into timing coincidence.

Arrival Time

In a good neuron model, the time of arrival of an input should have an effect on the time of output. A synaptic input—whether a Dirac delta function or a shaped post-synaptic potential (PSP), whether excitatory (EPSP) or inhibitory (IPSP)—has a time of arrival (e.g., the time of the delta function or the start or peak of a step or other input function), which may be referred to as the input time. A neuron output (i.e., a spike) has a time of occurrence (wherever it is measured, e.g., at the soma, at a point along the axon, or at an end of the axon), which may be referred to as the output time. That output time may be the time of the peak of the spike, the start of the spike, or any other time in relation to the output waveform. The overarching principle is that the output time depends on the input time.

One might at first glance think that all neuron models conform to this principle, but this is generally not true. For example, rate-based models do not have this feature. Many spiking models also do not generally conform. A leaky-integrate-and-fire (LIF) model does not fire any faster if there are extra inputs (beyond threshold). Moreover, models that might conform if modeled at very high timing resolution often will not conform when timing resolution is limited, such as to 1 ms steps.

Inputs

An input to a neuron model may include Dirac delta functions, such as inputs as currents, or conductance-based inputs.

In the latter case, the contribution to a neuron state may be continuous or state-dependent.

Example Implementation of Behavioral Homeostasis

Homeostasis is a property of a system to regulate itself in an effort to maintain stable operation. For stable useful operation, artificial neurons in artificial nervous systems (e.g., neural networks) are generally designed to operate in a particular range of activity levels. With too much or too little activity, the function and/or stability of artificial neurons and the system degrades or fails. This is particularly an issue for a learning or developing artificial nervous system where the contribution of inputs changes and the activity of neurons and the system changes as the artificial nervous system learns.

Prior methods of homeostasis have involved measuring a neuron's firing rate over a time window and then periodically adjusting the input contributions (e.g., weights or weight scaling) to maintain stable operation. However, there are several problems with this. Changes in input contribution can destabilize learning. Applying homeostatic adjustments in typical fashion can destabilize a learning system because the change in weights or inputs suddenly changes their contribution to the neuron state. This is particularly relevant in artificial nervous systems in which spike timing is important. This problem is perhaps most apparent for a synchronous set of pre-synaptic inputs. Changing their contribution, no matter how slightly, can suddenly stop or start post-synaptic firing. Moreover, constraining firing rate may conflict with the concept that information is coded in relative spike timing (inter-spike-intervals) or firing rates. In addition, applying typical homeostatic controls entails computing rates and adjusting weights or inputs, which constitute computational and memory overhead.

As described above, the Hunzinger Cold Model is a two-dimensional state dynamical spike-timing neuron model for spiking neural networks, which is, in standard form, defined by coupling the states at events. Although certain aspects of the present disclosure apply to spiking neuron models in general (such as the Izhikevich simple model, an exponential-integrate-and-fire (EIF) model, a FitzHugh-Nagumo model, or a quartic model), the Cold Model will be used as the basis for explanation below because of the convenience of the Cold Model for analysis and behavioral design. For example, the Cold Model has temporal computational advantages including monotonically decreasing memory of input differences with the ability to resolve temporal coincidences in a stable manner. In addition, the Cold Model is defined (parameters and coupling) in a way that is convenient for certain aspects of the present disclosure in terms of temporal features, such as the time constants.

Certain aspects of the present disclosure include a method of behavioral homeostasis by determining dynamic or temporal artificial neuron parameters based on neuron state or neuron state conditions. According to certain aspects, an artificial neuron with an elevated state of activity is modified to be more temporally selective by accelerating the dynamics by decreasing time constant(s), whereas an artificial neuron with a depressed state of activity is modified to be less temporally selective by decelerating the dynamics by increasing time constant(s). For certain aspects, when applied to a neuron model with leaky and anti-leaky regimes (the negative regime 402 and the positive regime 404, respectively, as illustrated in FIG. 4), only the leaky-regime time constant is adjusted. However, it should be understood that the method can be applied to other time constants in other regimes and to parameters other than time constants. Certain aspects of the present disclosure include configuring a neuron parameter so that neuron state reflects behavioral triggers for homeostatic events. At first glance, some of the aforementioned concepts may appear counterintuitive, but are explained in detail below.

Certain aspects of the present disclosure involve adjusting the absolute value of one or more time constant(s) $\tau$ of the neuron model as follows:

$$\Delta\tau = \begin{cases} -\Delta\tau_a & \text{if } u > u_a \\ +\Delta\tau_d & \text{if } u < u_d \\ 0 & \text{otherwise} \end{cases}$$

where the adjustment $\Delta\tau$ to the time constant r may, for example, be applied additively, multiplicatively, or by any of various other suitable means. The quantities $\Delta\tau_a$ and $\Delta\tau_d$ are the acceleration and deceleration adjustments, respectively, and the quantities $u_a$ and $u_d$ are the acceleration and deceleration state bounds, respectively. Various alternatives are possible where the time constant is adjusted depending on the state (whether in terms of the current state value(s), the time spent in a state region, the path or trajectory of the state, etc.). For example, the adjustment may be an exponential function of the state as follows:

$$\Delta\tau = -\Delta\tau_a e^{a(u-u_a)}\theta(u-u_a) + \Delta\tau_d e^{-d(u-u_d)}\theta(-(u-u_d))$$

where parameters a and d control the exponents for acceleration and deceleration. Other linear or nonlinear relationships are possible, both directly and indirectly, depending on one or more state variables.

In a conventional software or hardware artificial neuron where neuron models are iterated periodically, behavioral homeostasis may be applied at intervals. However, in event-based modeling, states may be updated upon events where the time between events may vary. In such a case, the homeostatic result may differ if applied based only on the value of the state variable(s) at the time of events. To compensate for this difference, the adjustment may be determined based on the path of the state variable(s) between events. This approach is well-suited to neuron models with closed-form expressions for state updates and for the time for the state to evolve from one state to another. Then, the homeostatic adjustment may be generalized to the following for time t between events:

$$\Delta\tau = \begin{cases} -\int_t \Delta\tau_a dt & \text{while } u > u_a \\ +\int_t \Delta\tau_d dt & \text{while } u < u_d \\ 0 & \text{otherwise} \end{cases}$$

However, if events occur very close together, approximation by update based on the current state at the event times may suffice. Moreover, even if events are not very close together, a linear or nonlinear approximation of the state trajectory between events may be used. For example, a linear approximation of the state path may be used between events. Determining the behavioral homeostasis adjustment may then be done by solving for the time spent in a particular region (e.g., $>u_a$) using the slope of the state change between the events relative to the time. In other words, approximating the state evolution between events as $$u(t_f) = u(t_0) + a(t_f - t_0)$$

yields a method to determine the time spent in a particular region of u. Either the state was in the region: (1) the entire time between the events so that the adjustment becomes $+\Delta\tau_d$ $(t_f-t_0)$ or $\Delta\tau_a(t_f-t_0)$; (2) none of the time so that the adjustment is 0; or (3) part of the time, in which case the adjustment depends on the slope. For example, if u is increasing, starting below $u_a$ and then exceeding $u_a$, the adjustment is $$\pm \Delta\tau_{a/d} \frac{u(t_f) - u_a}{u(t_f) - u(t_0)}(t_f - t_a) = \pm \Delta\tau_{a/d} \frac{u(t_f) - u_a}{a}$$

The same principle applies if u is decreasing between events or is crossing $u_d$ or both $u_a$ and $u_d$.

Homeostatic Control of Sustained Input

In the Cold Model described above, there are several time constants. The second state variable's stability is mainly determined by the second state's dynamics, governed by the second state variable's time constant $\tau_u$ and by reset offset $\Delta u$. The change from a reset point, assuming u=u(0) before the reset gives $$\Delta u_0(T) \cong (u(0) + \Delta u)s^{-\frac{T}{\tau_u}} - u(0)$$

Figure 5:
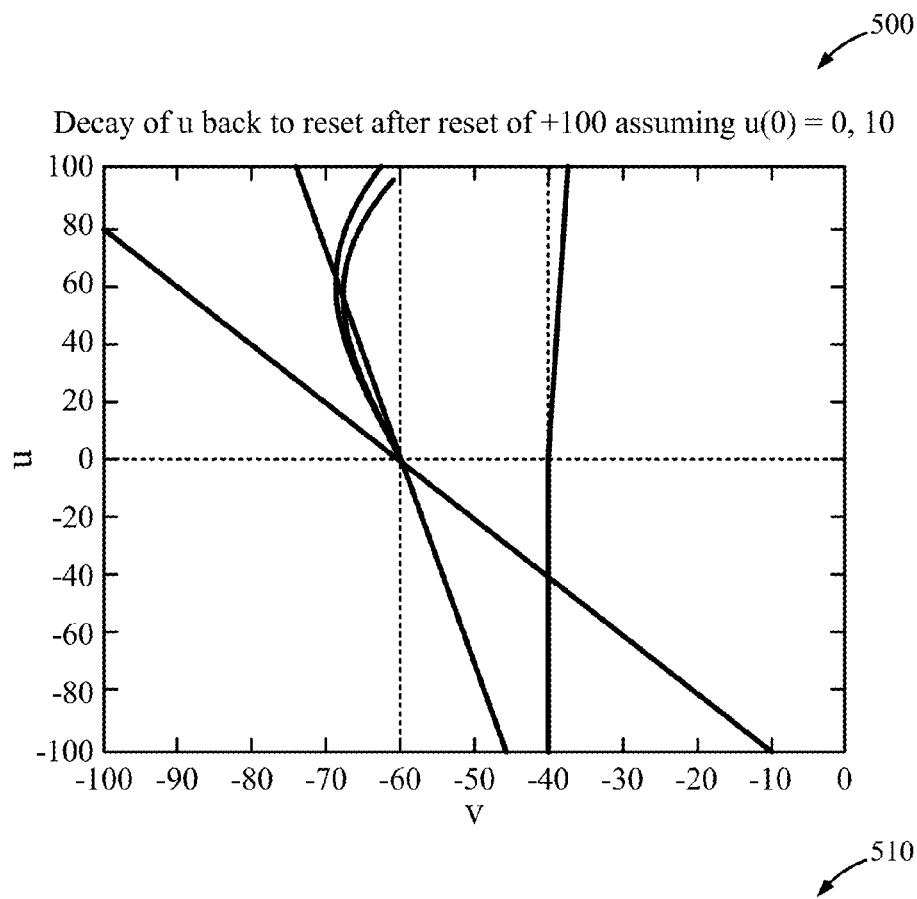
FIG. 5 illustrates the state trajectory in state space for two cases where the recovery current (u) is 0 or 10, in accordance with certain aspects of the present disclosure.
Figure 5:
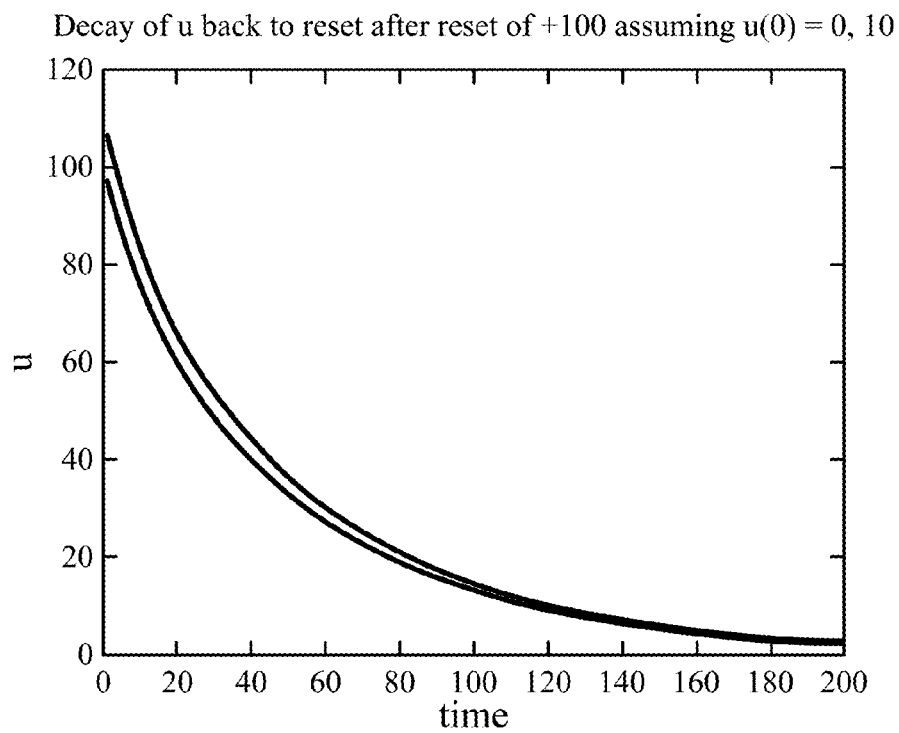

This effect can be seen in the graph 500 of FIG. 5, illustrating the state trajectory in state space for two cases where u(0)=0 and u(0)=10. Since $\Delta u$ is much larger, the time for the state u to decay exponentially back to near rest is almost the same, as illustrated in the graph 510. In this example the reset offset $\Delta u$ is 100, and the voltage reset value is −60 (this is the starting point in FIG. 5). The recovery reset point is u=0 at the voltage reset value of −60 (this is the end point in FIG. 5).

The dynamics of the first state variable also influence the second state generally to an extent depending on the time spent between rest and spiking. This dependence of the second state change as a function of that time over which the change occurs may be approximated as the following linear expression:

$$\Delta u_1(T) \cong cT$$

Figure 6A:
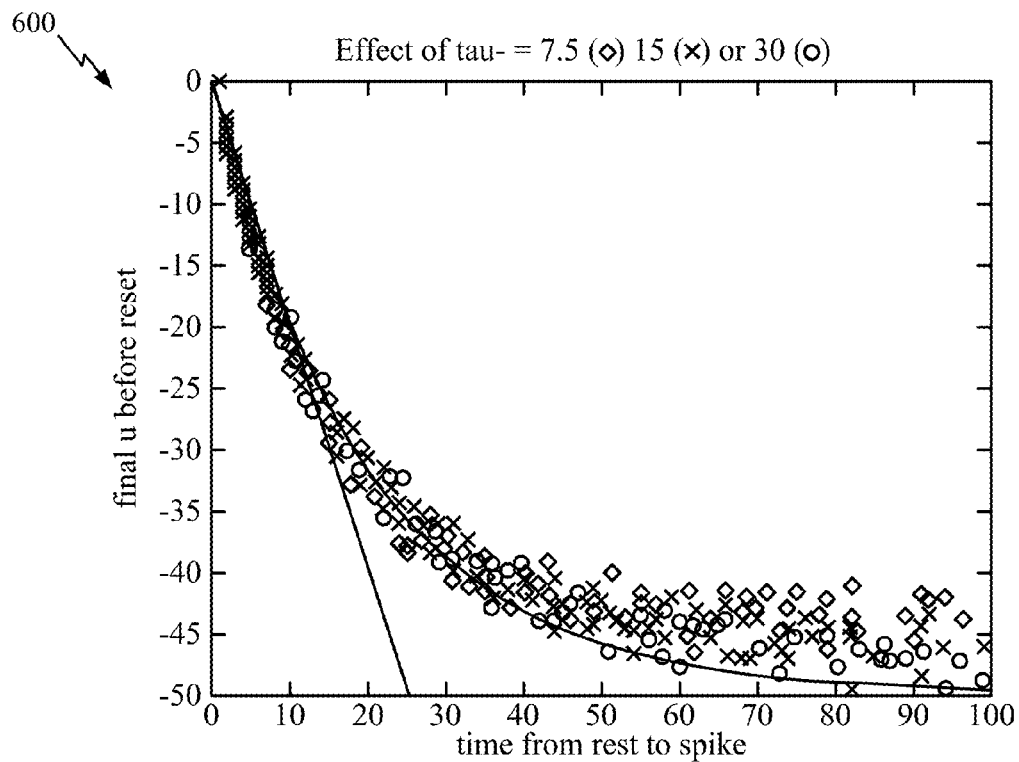
FIGS. 6A, 6B, and 6C illustrate plots of a final recovery current (u) before reset versus time from rest to spike for different values of the negative regime time constant ($\tau_-$), the positive regime time constant ($\tau_+$), and recovery time constant ($\tau_u$), respectively, in accordance with certain aspects of the present disclosure.
Figure 6B:
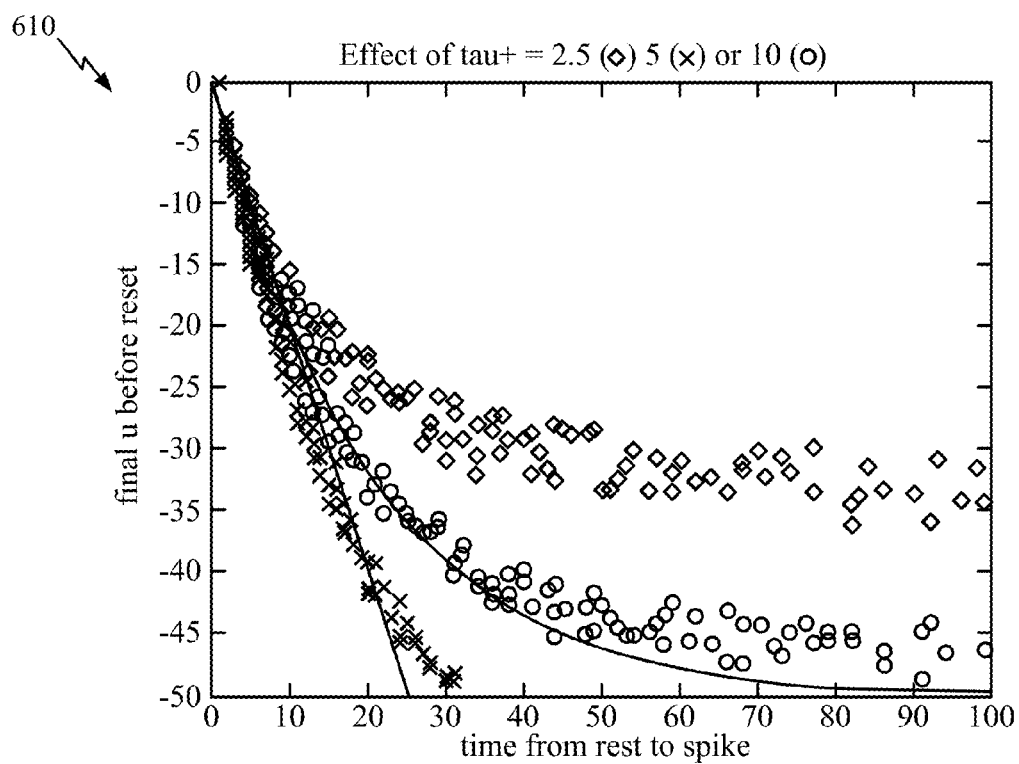
Figure 6C:
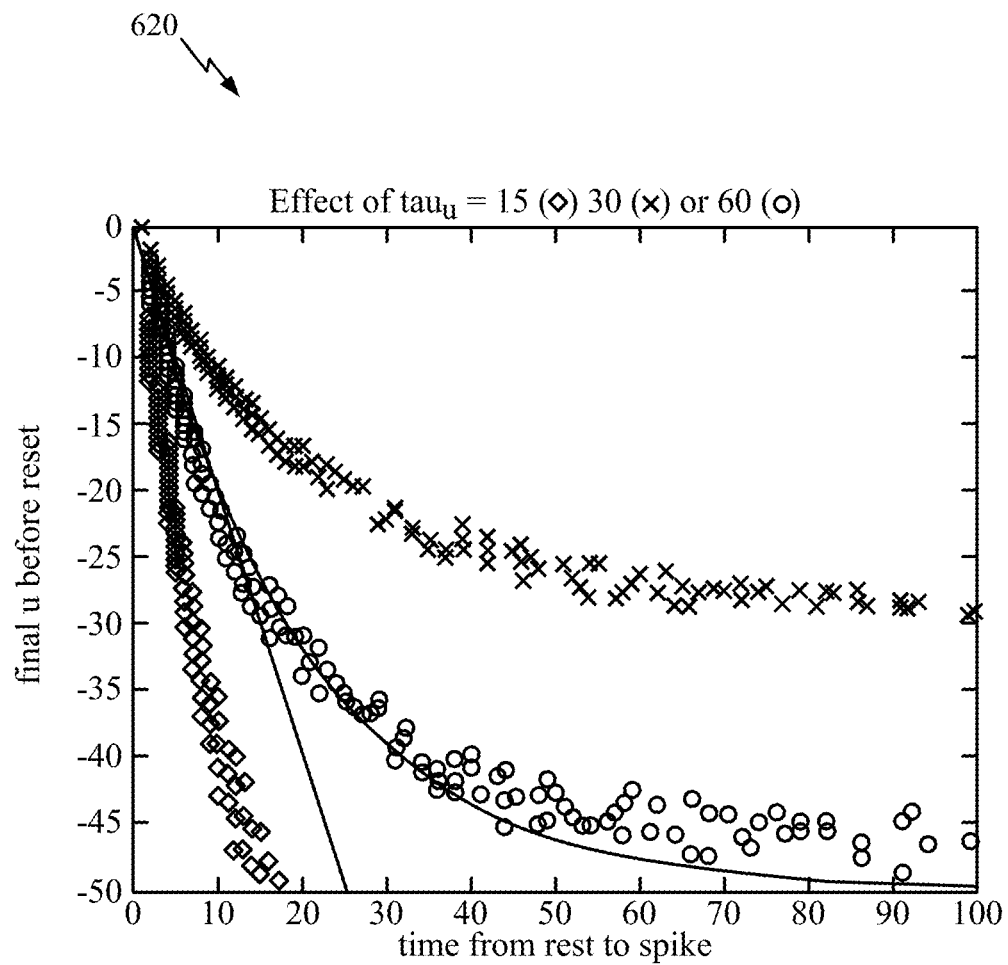

FIGS. 6A-6C depict the relationship between measured time from rest to spike and the final value of u before the reset (addition of $\Delta u$). As can be seen, the coupling effect dependence on the time between rest and spiking may not be linear. The second state slows as it approaches the null-cline and thus can be bounded. The dependence of the overall accumulated change on the state variable may be approximated as $$\Delta \hat{u} \cong c\left(1 - e^{\frac{-T}{t}}\right)$$

However, this change can typically be approximated by a linear function for relatively short time T as shown by the linear fit in the graph 600 of FIG. 6A below (where the slope c≅−2). Notice that the slope factor c is relatively invariant with the voltage time constant parameters because the dependence is on the time taken from rest to spike. FIG. 6A shows the results for varying $\tau_-$=7.5, 15, and 30. The y-axis represents the second state value u before the reset, while the x-axis represents the time spent from rest to spike (reset). The graph 610 of FIG. 6B shows the results for varying $\tau_+$=2.5, 5, and 10. The graph 620 of FIG. 6C shows the results for varying $\tau_u$=15, 30, and 60. Notice how the variation of $\tau_-$ in FIG. 6A makes little difference and how the variation of $\tau_+$ in FIG. 6B affects only the relationship for substantially larger time delays. Contrast this with how the variation of $T_u$ in FIG. 6C has a significant effect on the relation.

Of course, different model parameterizations affect these relationships. Aspects of the present disclosure do not depend on these relations or even these properties. This example is meant to be demonstrative in a simple case.

The two effects driving the dynamics of the second state variable u are not independent assuming there are intermediary coupling events, but these effects may be approximated as such, particularly under certain parameterizations. The total effect on the second state variable u may be approximated as $$u(T) = u(0) + \Delta u_0(T) + \Delta u_1(T)$$

and would cancel (equal zero or result in u(0)=u(T)) if the recovery from the reset is balanced by the coupled dynamics over that time. Since the time from rest to spike is the inverse of the rate, (T=1/r), the balance can be expressed as $$u(0) = (u(0) + \Delta u)e^{-\frac{1}{r\tau_u}} + \left(\frac{1}{r}\right)$$

By Maclaurin series expansion using the first two terms (linear), this condition holds if $$r \cong \left(\frac{1}{\tau_u} - \frac{c}{u(T) + \Delta u}\right)\left(1 + \frac{u(0)}{\Delta u}\right)$$

If u(0)=0 and c<<$\Delta u$, then $$t \cong \left(\frac{1}{\tau_u}\right)$$

Figure 7:
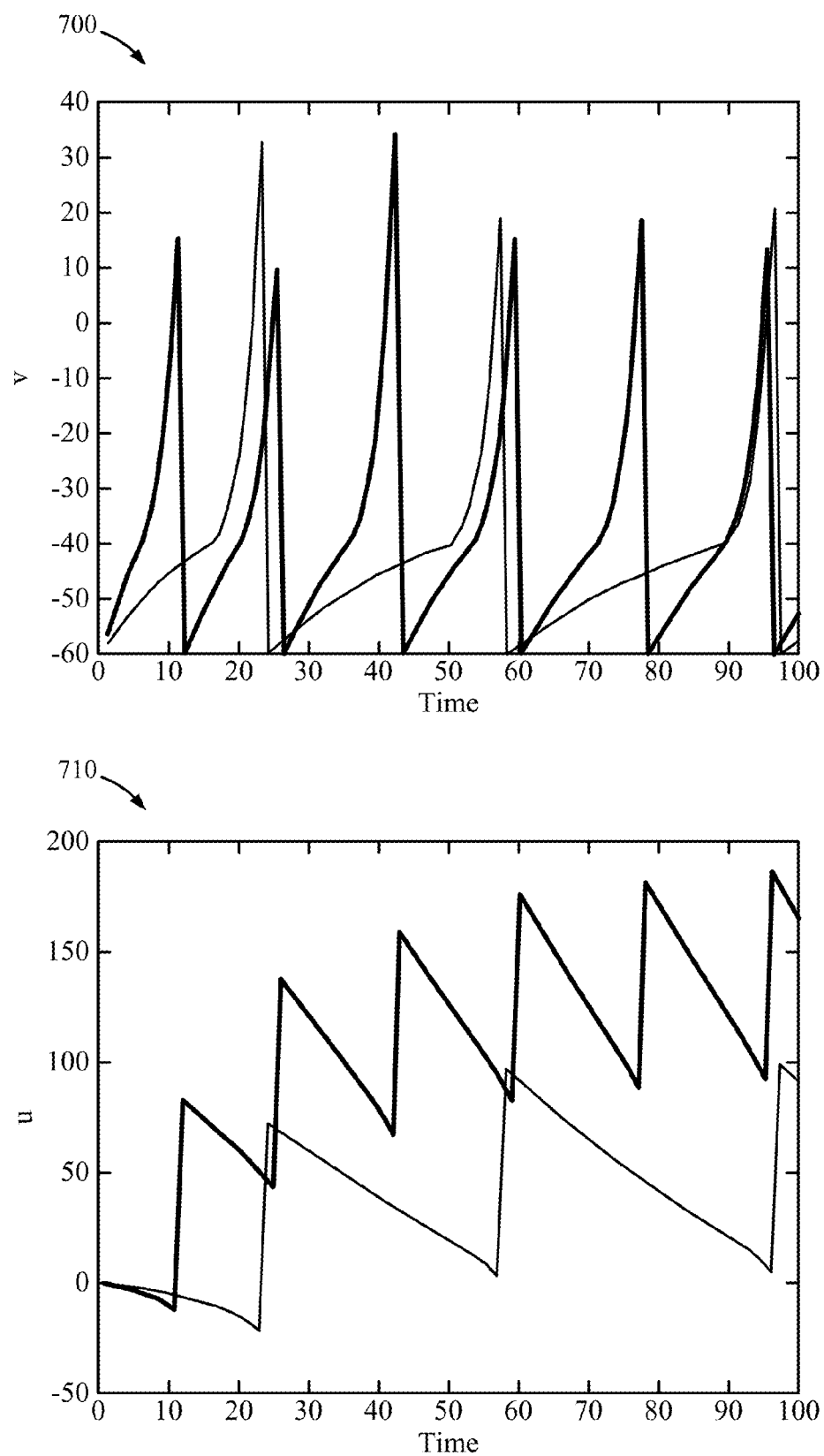
FIG. 7 illustrates tonic bursting with two levels of sustained input to illustrate the effects on spiking rate and stabilization of the recovery current, in accordance with certain aspects of the present disclosure.

Of course, the balance can occur at a higher value of u (because the dynamics from u(T) to u(0) would be faster). The same balancing principle applies, and according to the equation, the rate r would be substantially higher. FIG. 7 depicts tonic bursting with two levels of sustained input. The graph 700 depicts the voltage traces, while the graph 710 shows the second state variable's traces. In going from the thicker traces to the thinner traces in both graphs 700, 710, the input level is doubled, resulting in a doubling of the spiking rate (compare the thicker trace to the thinner trace in graph 700). However, this also results in a stabilization of u(0) at a higher level (around 100 for the thinner trace in graph 710, instead of around 0 for the thicker trace, referring to the lower points that u reaches on each cycle). This is consistent with the above derivations since $\Delta u$=100, and thus, the stabilizing rate is predicted to be about double. This gives the designer a means to theoretically or experimentally determine how to set the homeostatic parameters $u_a$ and $u_d$ to control the region in which u operates and thus the dynamics of the artificial neuron.

What this means is that to stabilize the artificial neuron's second state variable dynamics indicates particular spike timing characteristics, which may generally translate to a firing rate (or firing rate range if u(0)=0). However, this relation to rate is tenuous because the ability to characterize spike timing by a rate is limited. Nevertheless, this viewpoint can be useful for analyzing constant input and other simple, but demonstrative scenarios, particularly when considered in relation to conventional homeostasis mechanisms that are actually driven by rate. Accordingly, for the model described herein, if input drives an artificial neuron to spike faster than an upper rate bound, the second state begins to accumulate (destabilize). A conventional homeostatic mechanism adjusts the input or input contribution (e.g., via weights) in order to control an artificial neuron's firing rate. However, certain aspects of the present disclosure take an entirely different approach.

According to certain aspects, an artificial neuron's firing rate can be controlled by adjusting the time constant(s) parameters of the neuron. Although seemingly counter-intuitive, certain aspects of the present disclosure involve decreasing the time constant(s) to reduce the firing rate and increasing the time constant(s) to increase the firing rate. By reducing the time constant, the artificial neuron spends more time between rest and spike. Because the neuron spends more time between rest and spike, the second state's path results in a larger change and thus closer balance to the reset condition.

Figure 8:
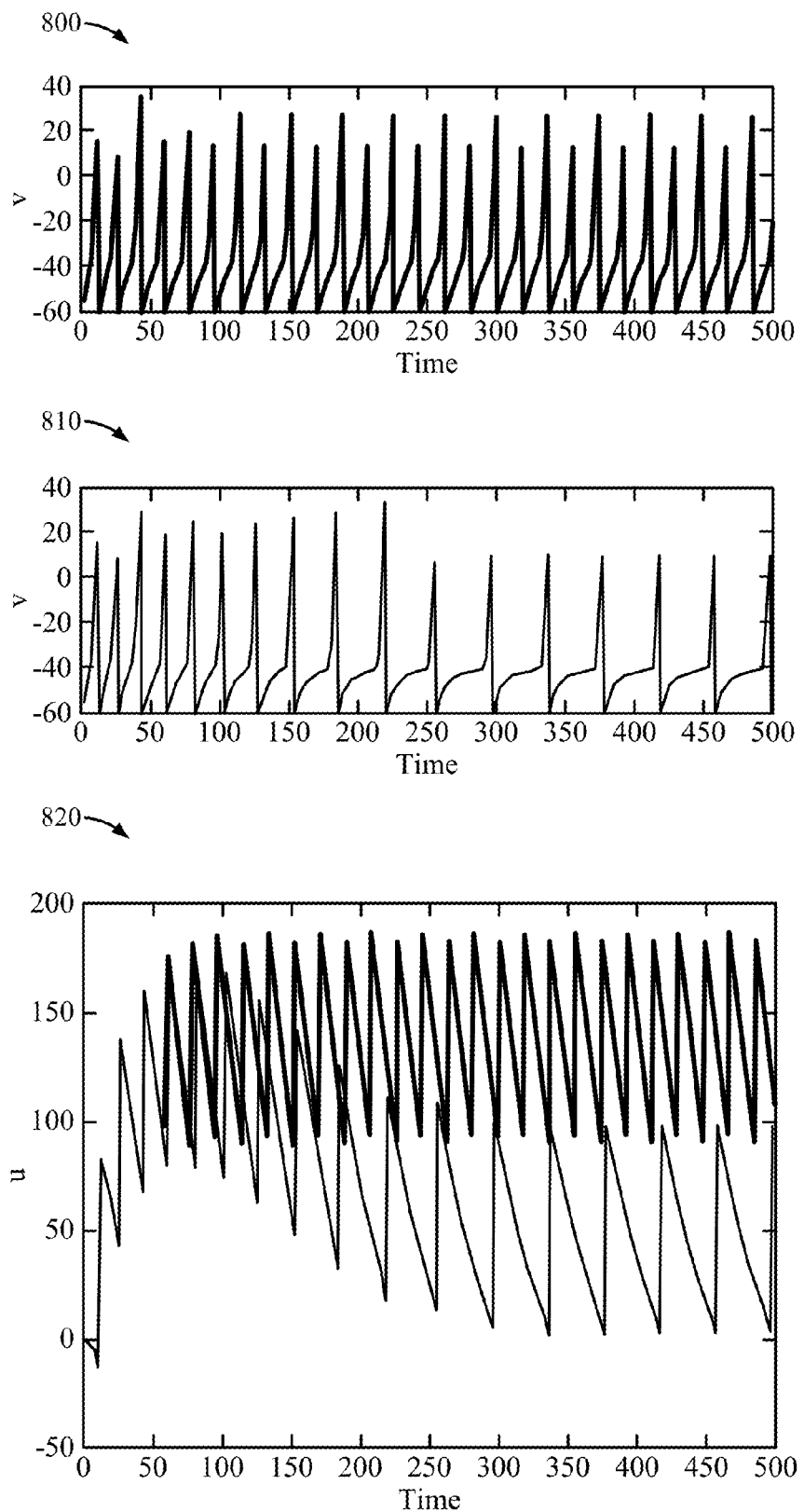
FIG. 8 compares an artificial neuron without and with behavioral homeostasis, where decreasing the absolute value of the time constant in the homeostatic mechanism reduces the firing rate, in accordance with certain aspects of the present disclosure.

FIG. 8 compares an artificial neuron with and without the behavioral homeostasis mechanism. As illustrated in the graph 800, the neuron without the homeostatic mechanism (thicker trace) has a high spiking rate which results in stabilization of u(500)≅100. By setting $u_d$=100 and $\Delta\tau_d$=0.01 when running at 1 ms coupling (events), the homeostatic method reduces the firing (as shown by the thinner trace in the graph 810) until the u state is constrained below $u_d$ by increasing the absolute value of the $\tau_-$ time constant from 14 to 23 ms (decreasing the value from −14 to −23 ms), as illustrated in the graph 820 of FIG. 8.

Figure 9:
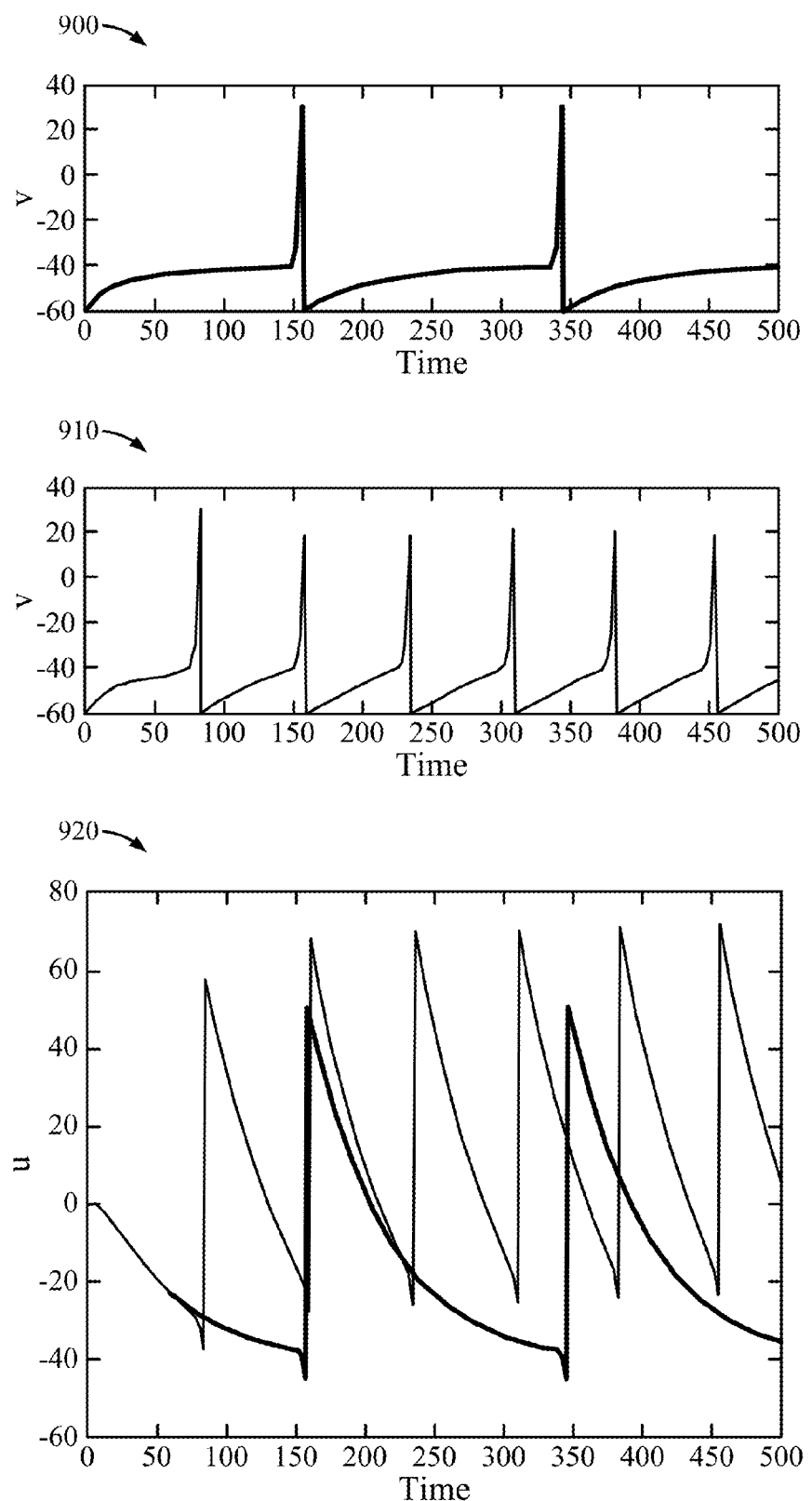
FIG. 9 compares an artificial neuron without and with behavioral homeostasis, where increasing the absolute value of the time constant in the homeostatic mechanism increases the firing rate, in accordance with certain aspects of the present disclosure.

In contrast, reducing the input and thus the firing rate causes the opposite homeostatic reaction, as shown in FIG. 9. By setting $u_a$=−20 and $\Delta\tau_a$=0.01 when running at 1 ms coupling (events), the homeostatic method increases the firing (compare the thicker trace in the graph 900 without homeostasis to the thinner trace in the graph 910 with homeostasis) until the u state is constrained above $u_a$ by decreasing the absolute value of the $\tau_-$ time constant from 14 to 5 ms (increasing the value from −14 to −5 ms), as illustrated in the graph 920 of FIG. 9.

As mentioned above, analyzing aspects of the present disclosure in terms of firing rate is limiting because not only is firing rate not the goal here, but firing rate does not characterize spike timing well. While the above analysis is useful for comparison in view of prior homeostatic methods, the full benefit of aspects of the present disclosure becomes evident when viewing dynamics in terms of spike timing.

Homeostatic Control of Spike-Timing Input

The same principles apply when the input consists of a set of sequences of spikes in time. For example, consider retinal ganglion cell (RGC) inputs to V1 simple cells. Each RGC responds to a change in light in a center-surround pattern (its receptive field). The timing of the RGC spike relative to the stimulus onset conveys information about the contrast and/or match of the stimulus to the pattern (receptive field). In a model of V1 simple cell development, simple cells develop oriented bar or Gabor-like receptive fields by learning the weights of incoming connections from RGCs using spike-timing dependent plasticity (STDP). By increasing the weights of connections from particular RGCs, the effective receptive field of the simple cell results from the combination of RGC receptive fields. However, if the range of the weights or initial values of the weights are set too high or low, the simple cells may fire too much or too little. Since STDP depends on spike timing, the resulting long-term potentiation (LTP) and long-term depression (LTD) may not result in development of simple cell receptive fields if the weights' ranges or initializations are too high or low. What is desired is a homeostatic method that manages behavior without disrupting the convergence of learning by changing the effect of individual input (weight) contributions.

As an example, an event-based Hunzinger Cold neuron model for a simple cell in V1 was developed, with excerpts of the C++ code included below:

```
inline double tau(bool depol)
{
    double t = _p->tau_c(depol);
    if(!depol) t*=local_alpha;
    return(t);
} inline void update(cronos_time dt, cronos_synapse_model *s)
{
    double i =((cold_synapse *)s)->w * ((basic_synapse *)s)->r *
_p->r;
    bool depol = v > _p->v_p;
    double q = calc_q(depol);
    double r = calc_r( );
    double tc = 1/_p->tau_g+1/_p->tau_c(depol);
    double eg1 = exp(-dt/_p->tau_g);
    double eg2 = exp(dt*tc);
    double ag = g*eg1*(eg2-1)/tc;
    g *= eg1;
    v = (v + q)*exp(dt/tau(depol))-q; // use tau adjusted by BH
    u = (u + r)*exp(-dt/_p->tau_u)-r;
    v += i - ag;
    accum_g(i);
    v = v > _p->v_max ? _p->v_max :
        (v < _p->v_min ? _p->v_min : v);
    // behavioral homeostasis (BH)
    if(u < _p->bhu_min && local_alpha < local_alpha_max)
    {
        local_alpha /=(1 - _p->r_c);
    }
    if(u > _p->bhu_max && local_alpha > local_alpha_min)
    {
        local_alpha /=(1 + _p->r_c);
    }
}
```

This scheme includes a method to scale the time constant for the LIF regime (negative regime 402) by a factor α to adjust neuron dynamics according to certain aspects of the present disclosure. This scheme also includes a method to process an incoming spike input event, which also involves the trigger and adjustment for behavioral homeostasis (BH). Adjustments are made by factors of (1±_p->r_c) where r_c is a BH parameter controlling the homeostatic gain.

In this code above, the input weight contributions are scaled by a factor _p->r. Without a homeostatic method, performance may be sensitive to this parameter for the reasons described above. However, by using behavioral homeostasis, a cell and network can maintain stable behavior over a wider range. The table below summarizes the results of using training/learning/developing Simple Cells with and without behavioral homeostasis in terms of number of simple cells (orientation selective cells) The homeostatic gain (r_c) was 0.01.

| Weight scaling parameter (r) | # of Simple Cells Developed/Learned | |
|---|---|---|
| | without BH | with BH |
| 1 | 84% | 85% |
| 1.5 | 87% | 95% |
| 2 | 69% | 95% |
| 4 | 19% | 50% |

Figure 10:
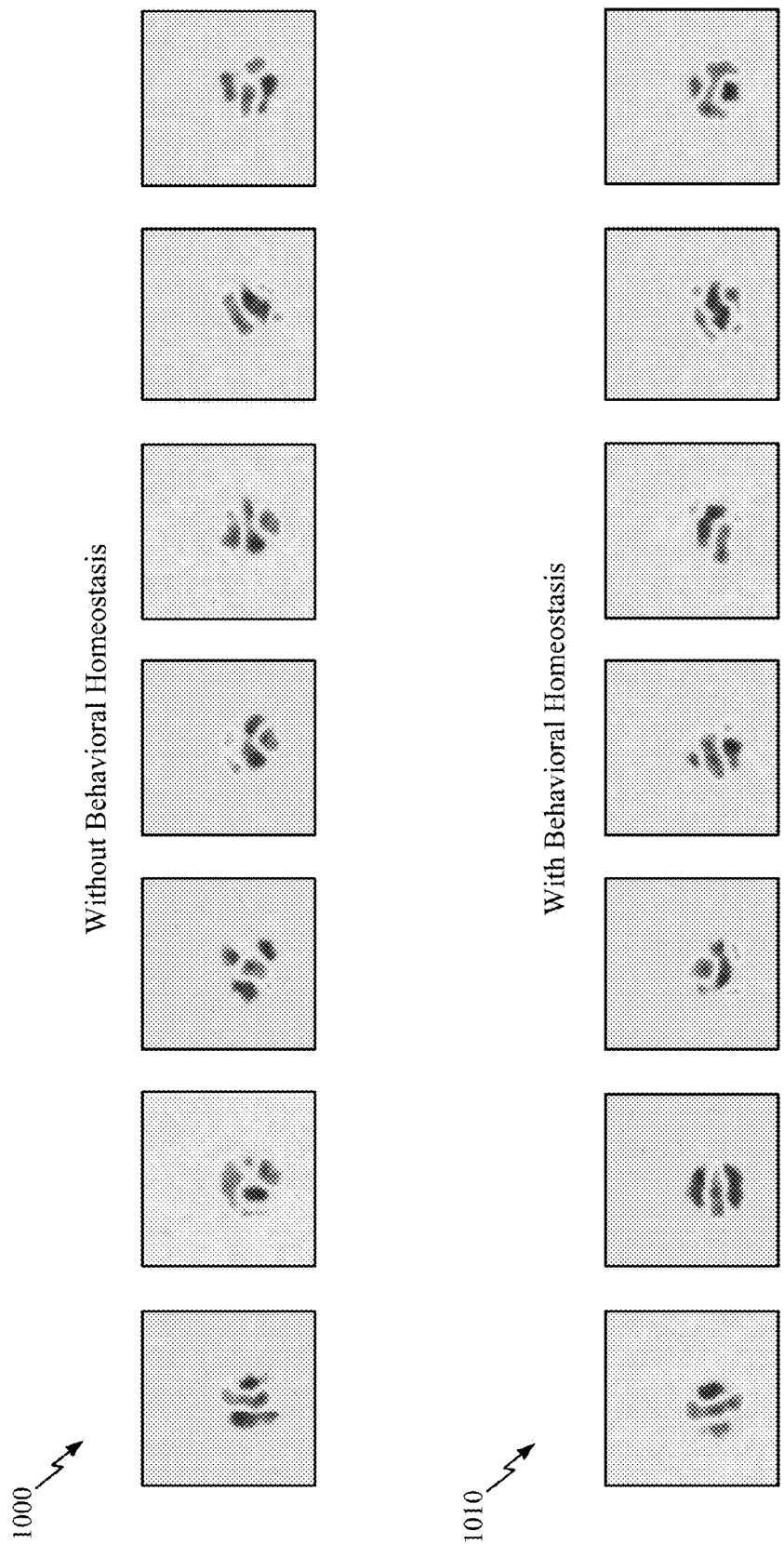
FIG. 10 compares a sample of V1 simple cell receptive fields without and with behavioral homeostasis, in accordance with certain aspects of the present disclosure.

These results were obtained despite the fact that the overall firing rate of the artificial nervous system remains similar with and without BH. A sample of the receptive fields for the r=2 case are shown in FIG. 10. The difference may appear subtle: the elements of the receptive fields in the sample without BH 1000 tend to be less oriented (more like a collection of points). Most of the receptive fields in the sample with BH 1010 have at least one element that is oriented (not a point). A receptive field that is a collection of points is more likely to respond to both horizontal and vertical edges (or some other two orientations). This problem may be caused, for example, by a neuron firing too much, responding to and thus learning multiple orientations.

In the above case, the parameters for BH were conservatively set as follows:

Condition for accelerating dynamics: u<−250 at input event time

Condition for decelerating dynamics: u>500 at input event time

Of course, if there is sufficiently frequent synchronous input (coincident spikes) to cause the post-synaptic neuron to fire at a frequency that results in an accumulation of state variable u, there may be no time constant adjustment that could overcome this. For example, even if there is no memory or $\tau_-=0$, the perfectly coincident spikes can still cause the neuron to fire. Likewise, if there is simply too little input (no input), there is no time constant (even $\tau_-=\infty$) that could cause the neuron to fire. But that is as desired. The goal is not to cause a neuron to fire if there is no input or to stop firing if there is sufficient coincident input.

Therefore, it may also be desirable to configure the reset condition (increase in state variable u) appropriately and/or bound the time constant value ranges. For example, one may bound the time constant adjustment to one order of magnitude in either direction of the nominal value. In the above example, the bounds on dynamics adjustment from nominal $\alpha=1$ were [0.1, 10].

It may not be desirable to continuously monitor state variable u and subsequently adjust the neuron dynamics accordingly. Therefore, state variable u may be checked against the homeostatic conditions based on events or periodically, for example. In the latter case, however, if there were only sporadic spikes, after each spike and a reset, even when there is no subsequent activity for a time period at the artificial neuron, the artificial neuron could repeatedly increase the time constant to achieve slower and slower decay, hence slower and slower dynamics. This is an undesirable behavior: low-rate, sporadic spikes leading to slowing of the neuron dynamics. To counteract this behavior, certain aspects of the present disclosure may include three additional variables: spike count, spike upper threshold, and spike lower threshold, where spike count indicates the number of spikes in an artificial neuron within a period p, spike upper threshold sets the maximum number of spikes within the period p before the neuron dynamics are slowed down, and spike lower threshold sets the minimum number of spikes within the period p before the neuron dynamics are sped up. The variable spike count is reset to zero after each period p.

There are several functional advantages to aspects of the present disclosure. First, by decreasing or increasing the time constant(s), the artificial neuron's temporal computational function is either sharpened or dulled, respectively. Thus, an artificial neuron that is over-firing is "sharpened." As used herein, the term "sharpening" generally means the artificial neuron is more selective to temporal aspects of the input. An artificial neuron that is under-firing is "dulled." As used herein, the term "dulling" generally means the artificial neuron is more integrative and less sensitive to temporal aspects of input. Second, adjusting the time constants has a purely temporal effect. The underlying dynamics of the model do not change when the time constants are scaled together. Even if the voltage time constant(s) are changed without changing the second state time constant, there is effectively no change in the dynamics due to the arbitrary scale of the second state. Third, changing time constants does not change the amount of instantaneous input involved to cause the artificial neuron to fire. The threshold effectively remains the same. Fourth, because the weights or inputs are not scaled, there is no discontinuity in the contribution of particular inputs. The homeostatic mechanism has no immediate or direct impact on behavior. Strictly speaking, the impact is at the next event, but the impact to input contribution is indirect, affecting the dynamics after the input, rather than the input itself. This means that the artificial neuron's operation is more stable across discrete homeostatic adjustments.

There are also several computational advantages to aspects of the present disclosure. First, there is no need to compute or maintain memory of an artificial neuron's spikes in order to compute a firing rate. The homeostatic mechanism may be based entirely on the state. Second, there is no need to compute or maintain memory of a weight scaling factor. The homeostatic mechanism disclosed herein operates on the time constants. Of course, this means that at least one time constant should be variable rather than fixed. Third, there is no need to make periodic adjustments. Rather, adjustments can be made at the time of events (i.e., on the fly). Fourth, the trigger is based on a variable (state variable) that is already associated with the model (i.e., the variable is reused).

One disadvantage of certain aspects of the present disclosure is that adjustments are to the model dynamics, and thus, one or more dynamics' parameters may be variable. An alternative or countermeasure to this is to use the behavioral homeostasis as a trigger, but use the conventional adjustment method of scaling weights (i.e., weight contribution).

It should also be noted that certain aspects of the present disclosure are particularly suited to the Hunzinger Cold model, not only because of inherent stability of that model, but also because of the flexible parameterization of the kinetics. Although the invention may be used with other neuron models, in general, neuron models with flexibility and stability in terms of dynamics control work well.

Figure 11:
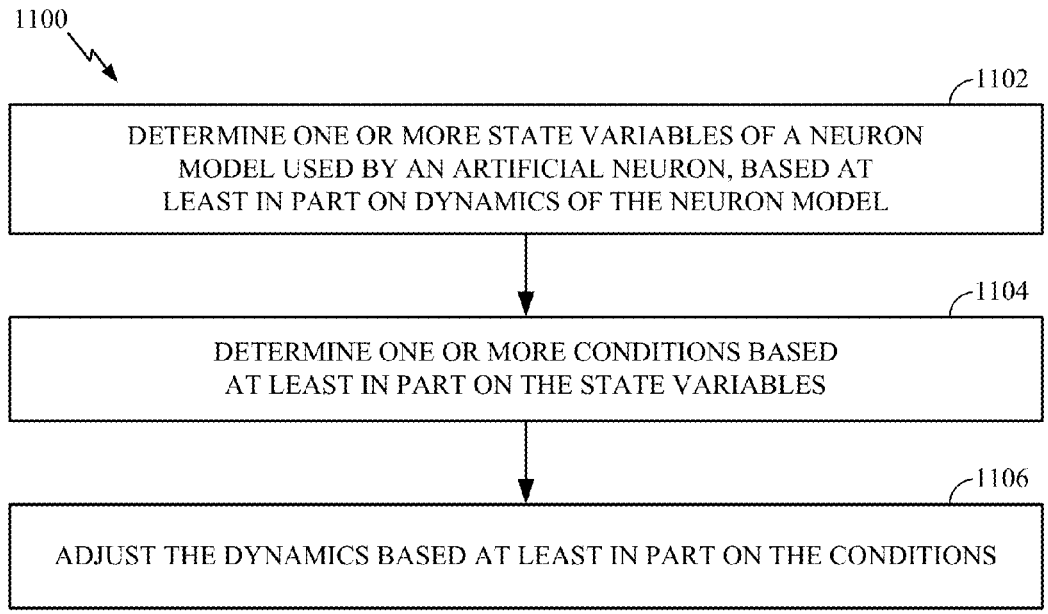
FIG. 11 is a flow diagram of example operations for implementing homeostasis of an artificial nervous system, from the perspective of an artificial neuron, in accordance with certain aspects of the present disclosure.

FIG. 11 is a flow diagram of example operations 1100 for implementing (behavioral) homeostasis of an artificial nervous system, from the perspective of an artificial neuron using a neuron model, in accordance with certain aspects of the present disclosure. The operations 1100 may be performed in hardware (e.g., by one or more neural processing units, such as a neuromorphic processor), in software, or in firmware. The artificial nervous system may be modeled on any of various biological or imaginary nervous systems, such as a visual nervous system, an auditory nervous system, the hippocampus, etc. For certain aspects, the artificial nervous system may be a spiking neural network.

The operations 1100 may begin, at 1102, with the artificial neuron determining one or more state variables (e.g., v and u)

of a neuron model based, at least in part, on dynamics of the neuron model (i.e., neuron dynamics). For certain aspects, the neuron model comprises a neuron model having two or more state variables, wherein one of the two or more state variables comprises a recovery variable. For example, the neuron model may include any of various suitable neuron models, such as an Izhikevich simple model, an exponential-integrate-and-fire (EIF) model, a FitzHugh-Nagumo model, a quartic model, or a Hunzinger Cold model.

At 1104, the artificial neuron may determine one or more conditions (e.g., homeostatic conditions) based, at least in part, on the state variables. At 1106, the artificial neuron may adjust the neuron dynamics based, at least in part, on the conditions.

According to certain aspects, the conditions include a recovery variable value below a relatively lower threshold. In this case, the adjusting at 1106 may involve slowing the dynamics. Slowing (i.e., decelerating) the dynamics may entail increasing a time constant of a LIF regime of the neuron model.

According to certain aspects, the conditions include a recovery variable above a relatively higher threshold. In this case, the adjusting at 1106 may involve accelerating the dynamics. Accelerating the dynamics may entail decreasing a time constant of a LIF regime of the neuron model.

According to certain aspects, the adjusting at 1106 may entail adjusting a time constant in the neuron model used by the artificial neuron. In this case, an absolute value of the time constant may be decreased to increase a firing rate of the artificial neuron, and the absolute value of the time constant may be increased to decrease the firing rate of the artificial neuron.

According to certain aspects, the adjusting at 1106 may involve adjusting the neuron dynamics based (at least in part) on at least one of intervals, events, or a path of the state variables between the events.

According to certain aspects, determining the one or more conditions at 1104 involves determining the one or more conditions based (at least in part) on spiking events of the artificial neuron (i.e., event-based checking of the recovery variable, for example). For other aspects, determining the one or more conditions involves periodically determining the one or more conditions at an interval (i.e., periodic checking of the recovery variable, for example). In this case, the one or more state variables may include a membrane potential of the artificial neuron, the conditions include a number of spikes (e.g., a spike count) of the membrane potential in the interval (e.g., period p) being above a threshold (e.g., spike upper threshold), and the adjusting at 1106 involves slowing the dynamics of the neuron model if the number of spikes in the interval is above the threshold. Slowing (i.e., decelerating) the dynamics may entail increasing a time constant of a LIF regime of the neuron model, for example. In another case, the one or more state variables may include a membrane potential of the artificial neuron, the conditions include a number of spikes of the membrane potential in the interval being below a threshold (e.g., spike lower threshold), and the adjusting at 1106 involves increasing the dynamics of the neuron model if the number of spikes in the interval is below the threshold. Accelerating the dynamics may entail decreasing a time constant of a LIF regime of the neuron model, for example.

In yet another case, the one or more state variables may include a membrane potential of the artificial neuron, the conditions include a number of spikes of the membrane potential in the interval being below a first threshold (e.g., spike upper threshold) and above a second threshold (e.g., spike lower threshold), the first threshold is greater than the second threshold, and the adjusting at 1106 involves changing the dynamics of the neuron model to a constant value if the number of spikes in the interval is between the first and second thresholds. For other aspects, if the number of spikes in the interval is between the first and second thresholds, then the neuron dynamics may not be adjusted.

Figure 12:
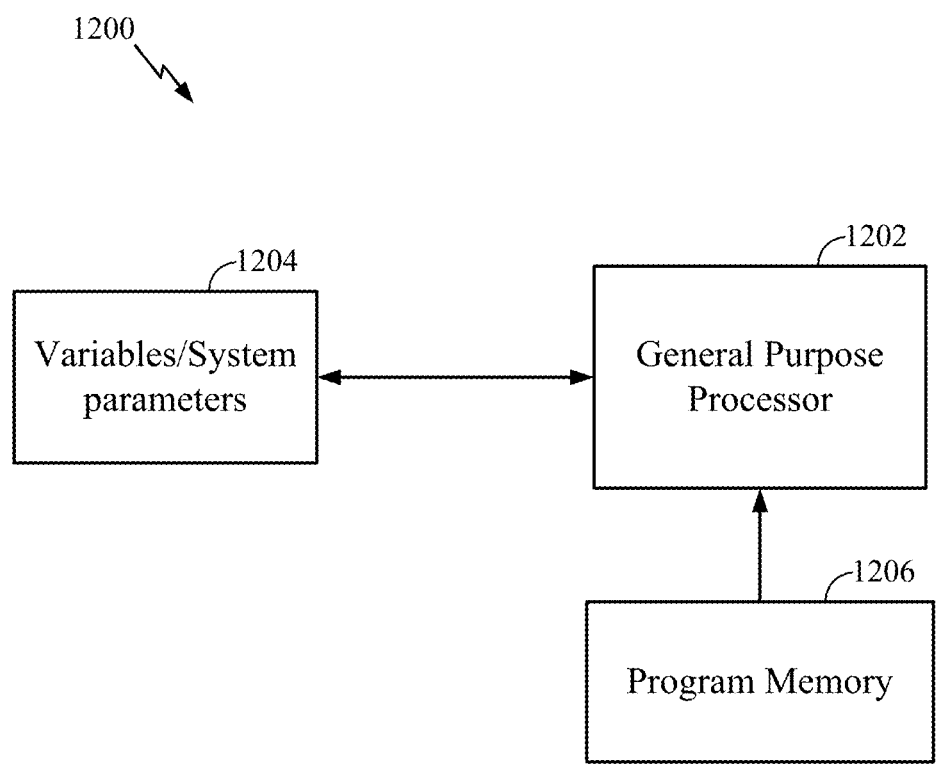
FIG. 12 illustrates example components for implementing homeostasis of an artificial nervous system using a general-purpose processor, in accordance with certain aspects of the present disclosure.

FIG. 12 illustrates an example block diagram 1200 of components for implementing (behavioral) homeostasis of an artificial nervous system using a general-purpose processor 1202 in accordance with certain aspects of the present disclosure. Variables (neural signals), synaptic weights, and/or system parameters associated with a computational network (neural network) may be stored in a memory block 1204, while instructions related executed at the general-purpose processor 1202 may be loaded from a program memory 1206. In an aspect of the present disclosure, the instructions loaded into the general-purpose processor 1202 may comprise code for determining one or more state variables of a neuron model used by an artificial neuron, based at least in part on dynamics of the neuron model, code for determining one or more conditions based at least in part on the state variables, and code for adjusting the dynamics based at least in part on the conditions.

Figure 13:
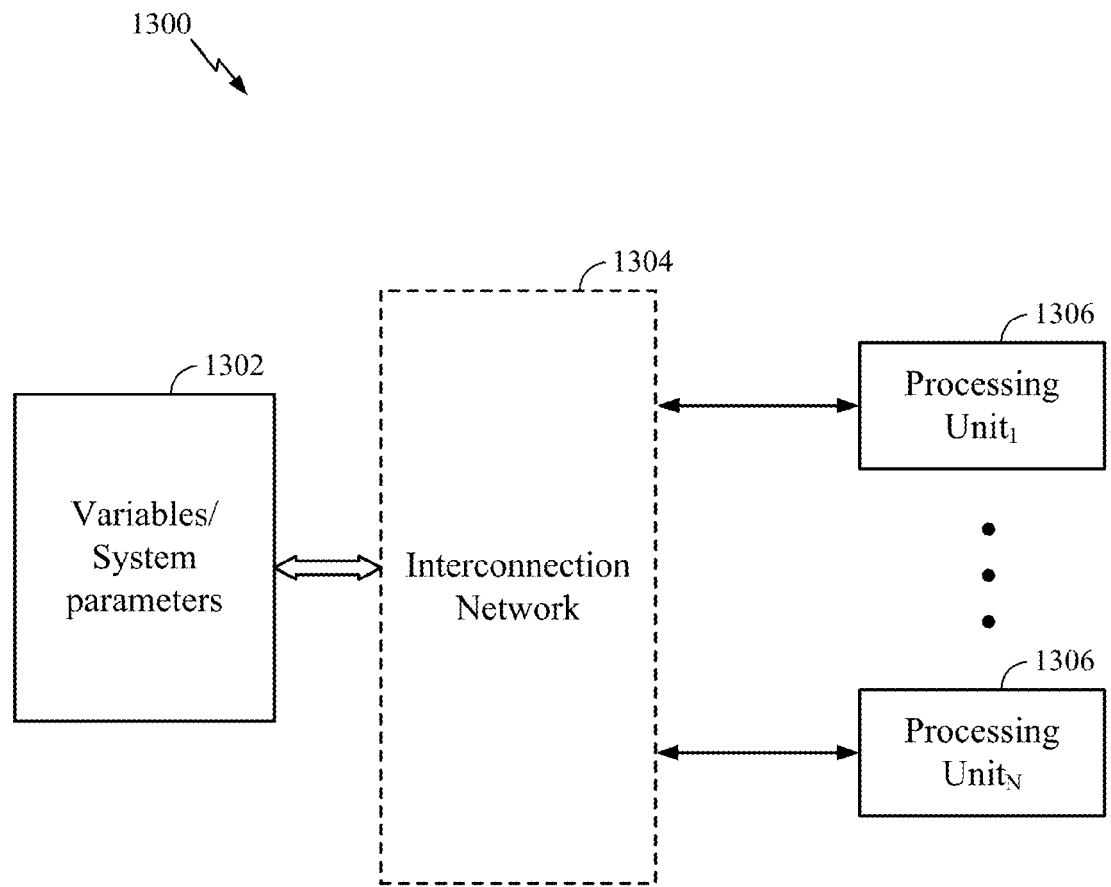
FIG. 13 illustrates example components for implementing homeostasis of an artificial nervous system where a memory may be interfaced with individual distributed processing units, in accordance with certain aspects of the present disclosure.

FIG. 13 illustrates an example block diagram 1300 of components for implementing (behavioral) homeostasis of an artificial nervous system where a memory 1302 can be interfaced via an interconnection network 1304 with individual (distributed) processing units (neural processors) 1306 of a computational network (neural network) in accordance with certain aspects of the present disclosure. Variables (neural signals), synaptic weights, and/or system parameters associated with the computational network (neural network) may be stored in the memory 1302, and may be loaded from the memory 1302 via connection(s) of the interconnection network 1304 into each processing unit (neural processor) 1306. In an aspect of the present disclosure, the processing unit 1306 may be configured to determine one or more state variables of a neuron model used by an artificial neuron, based at least in part on neuron dynamics, to determine one or more (homeostatic) conditions based at least in part on the state variables, and to adjust the neuron dynamics based at least in part on the (homeostatic) conditions.

Figure 14:
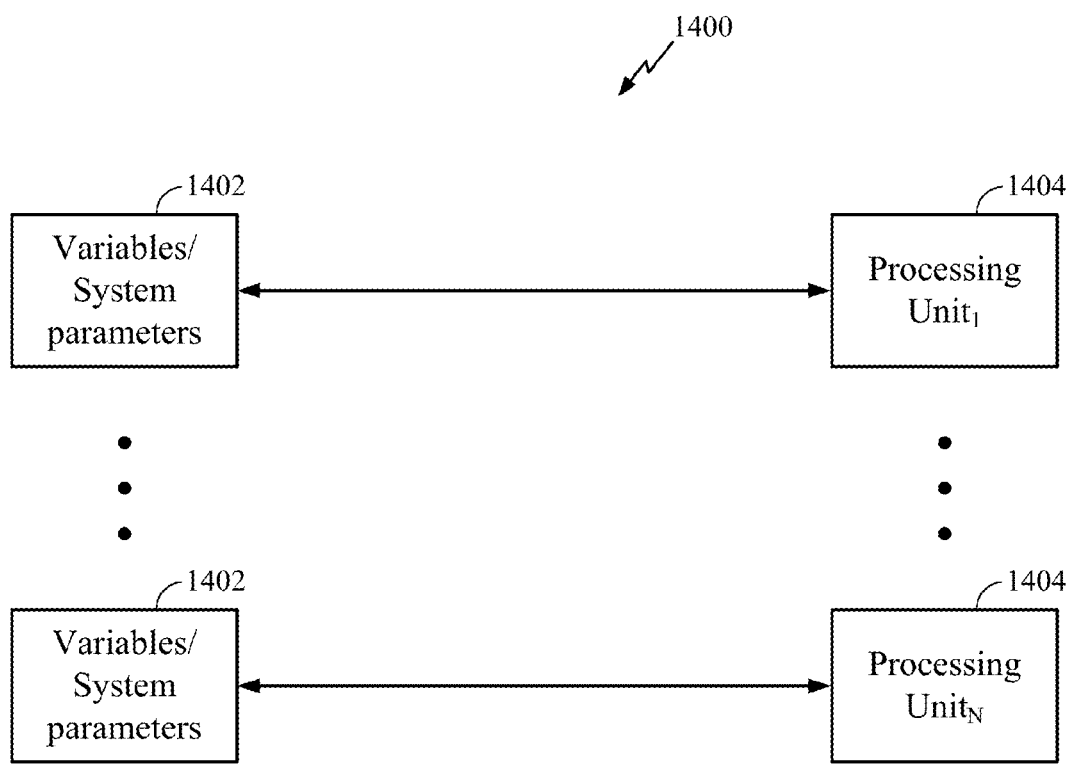
FIG. 14 illustrates example components for implementing homeostasis of an artificial nervous system based on distributed memories and distributed processing units, in accordance with certain aspects of the present disclosure.

FIG. 14 illustrates an example block diagram 1400 of components for implementing (behavioral) homeostasis of an artificial nervous system based on distributed weight memories 1402 and distributed processing units (neural processors) 1404 in accordance with certain aspects of the present disclosure. As illustrated in FIG. 14, one memory bank 1402 may be directly interfaced with one processing unit 1404 of a computational network (neural network), wherein that memory bank 1402 may store variables (neural signals), synaptic weights, and/or system parameters associated with that processing unit (neural processor) 1404. In an aspect of the present disclosure, the processing unit(s) 1404 may be configured to determine one or more state variables of a neuron model used by an artificial neuron, based at least in part on neuron dynamics, to determine one or more (homeostatic) conditions based at least in part on the state variables, and to adjust the neuron dynamics based at least in part on the (homeostatic) conditions.

Figure 15:
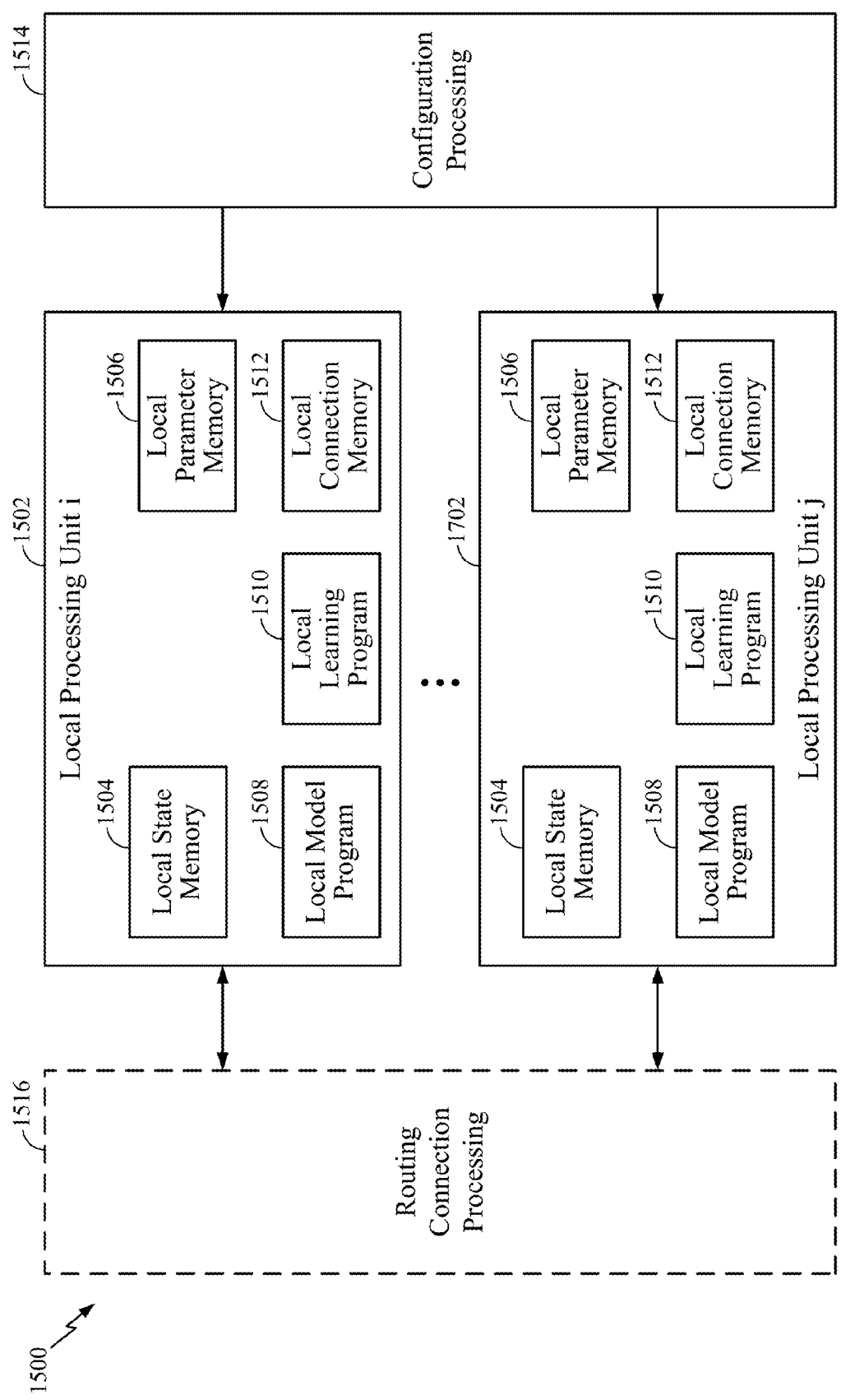
FIG. 15 illustrates an example implementation of a neural network in accordance with certain aspects of the present disclosure.

FIG. 15 illustrates an example implementation of a neural network 1500 in accordance with certain aspects of the present disclosure. As illustrated in FIG. 15, the neural network 1500 may comprise a plurality of local processing units 1502 that may perform various operations of methods described above. Each processing unit 1502 may comprise a local state memory 1504 and a local parameter memory 1506 that store parameters of the neural network. In addition, the processing unit 1502 may comprise a memory 1508 with a local (neuron) model program, a memory 1510 with a local learning program, and a local connection memory 1512. Furthermore, as illustrated in FIG. 15, each local processing unit 1502 may be interfaced with a unit 1514 for configuration processing that may provide configuration for local memories of the local processing unit, and with routing connection processing elements 1516 that provide routing between the local processing units 1502.

According to certain aspects of the present disclosure, each local processing unit 1502 may be configured to determine parameters of the neural network based upon desired one or more functional features of the neural network, and develop the one or more functional features towards the desired functional features as the determined parameters are further adapted, tuned and updated.

CONCLUSION

Homeostatic control of neural activity is important to spiking neural networks because of the potential for widely varying activity over time and space. Typical homeostatic controls are rate-based mechanisms that alter the instantaneous contribution of inputs to attempt to adjust an artificial neuron's firing rate. However, instantaneous changes in input contribution can destabilize learning. Applying homeostatic adjustments in typical fashion can destabilize a learning artificial nervous system because the changes in weights or inputs suddenly alter their contribution to the neuron state. This is particularly relevant in artificial nervous systems in which spike timing is important. This problem is perhaps most apparent for a synchronous set of presynaptic inputs. Changing their contribution—no matter how slightly—can suddenly stop or start post-synaptic firing. Moreover, constraining firing rate may conflict with the concept that information is coded in relative spike timing (inter-spike-intervals) or firing rates. In addition, applying typical homeostatic controls entails computing rates and adjusting weights or inputs, which constitute computational and memory overhead.

Aspects of the present disclosure resolve all of these problems. According to certain aspects, the homeostatic mechanism is driven by neuron state rather than the neuron spiking rate, and the homeostatic mechanism drives changes to the neuron temporal dynamics rather than to contribution of input or weights. The goal is to obtain desirable neuron dynamics rather than spiking rate. As a result, certain aspects of the present disclosure are a more natural fit with spiking neural networks and have many computational and functional advantages.

Figure 11A:
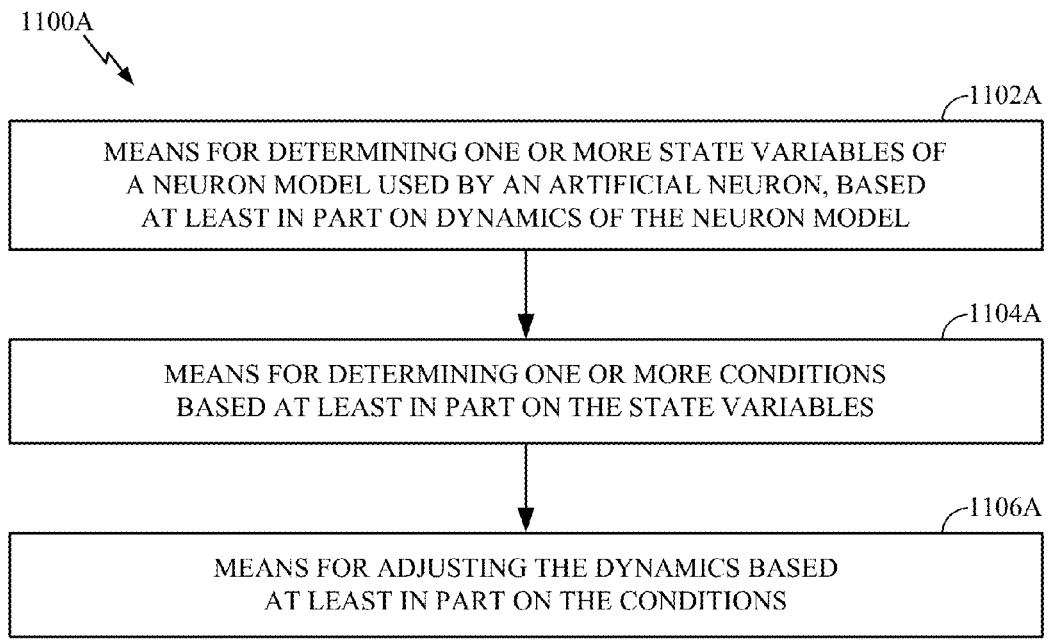
FIG. 11A illustrates example means capable of performing the operations shown in FIG. 11.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various operations may be performed by one or more of the various processors shown in FIGS. 12-15. Generally, where there are operations illustrated in figures, those operations may have corresponding counterpart means-plus-function components with similar numbering. For example, operations 1100 illustrated in FIG. 11 correspond to means 1100A illustrated in FIG. 11A.

For example, means for displaying may include a display (e.g., a monitor, flat screen, touch screen, and the like), a printer, or any other suitable means for outputting data for visual depiction (e.g., a table, chart, or graph). Means for processing, means for observing, means for modulating, means for repeating, means for allowing time, means for receiving, means for sending, means for generating, means for taking one or more actions, means for adjusting, means for sending data, or means for determining may comprise a processing system, which may include one or more processors or processing units. Means for sensing may include a sensor. Means for storing may include a memory or any other suitable storage device (e.g., RAM), which may be accessed by the processing system.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for implementing homeostasis of an artificial nervous system, comprising:
   determining one or more state variables of a neuron model used by an artificial neuron, based at least in part on dynamics of the neuron model;
   determining one or more conditions based at least in part on the state variables; and
   adjusting the dynamics based at least in part on the conditions.

2. The method of claim 1, wherein the one or more state variables comprise a recovery variable of the artificial neuron.

3. The method of claim 2, wherein the conditions comprise a value of the recovery variable being below a threshold.

4. The method of claim 3, wherein the adjusting comprises slowing the dynamics of the neuron model if the value of the recovery variable is below the threshold.

5. The method of claim 4, wherein slowing the dynamics comprises increasing a time constant of a leaky-integrate-and-fire (LIF) regime of the neuron model.

6. The method of claim 2, wherein the conditions comprise a value of the recovery variable being above a threshold.

7. The method of claim 6, wherein the adjusting comprises accelerating the dynamics of the neuron model if the value of the recovery variable is above the threshold.

8. The method of claim 7, wherein accelerating the dynamics comprises decreasing a time constant of a leaky-integrate-and-fire (LIF) regime of the neuron model.

9. The method of claim 1, wherein the adjusting comprises adjusting a time constant in the neuron model used by the artificial neuron.

10. The method of claim 9, wherein an absolute value of the time constant is decreased to increase a firing rate of the artificial neuron and wherein the absolute value of the time constant is increased to decrease the firing rate of the artificial neuron.

11. The method of claim 1, wherein the adjusting comprises adjusting the dynamics of the neuron model based at least in part on at least one of intervals, events, or a path of the state variables between the events.

12. The method of claim 1, wherein the neuron model comprises a neuron model having two or more state variables, wherein one of the two or more state variables comprises a recovery variable.

13. The method of claim 12, wherein the neuron model comprises at least one of an Izhikevich simple model, an exponential-integrate-and-fire (EIF) model, a FitzHugh-Nagumo model, a quartic model, or a Hunzinger Cold model.

14. The method of claim 1, wherein determining the one or more conditions comprises determining the one or more conditions based at least in part on spiking events of the artificial neuron.

15. The method of claim 1, wherein determining the one or more conditions comprises periodically determining the one or more conditions at an interval.

16. The method of claim 15, wherein the one or more state variables comprise a membrane potential of the artificial neuron, wherein the one or more conditions comprise a number of spikes of the membrane potential in the interval being above a threshold, and wherein the adjusting comprises slowing the dynamics of the neuron model if the number of spikes in the interval is above the threshold.

17. The method of claim 15, wherein the one or more state variables comprise a membrane potential of the artificial neuron, wherein the one or more conditions comprise a number of spikes of the membrane potential in the interval being below a threshold, and wherein the adjusting comprises increasing the dynamics of the neuron model if the number of spikes in the interval is below the threshold.

18. The method of claim 1, wherein the artificial nervous system comprises a spiking neural network.

19. An apparatus for implementing homeostasis of an artificial nervous system, comprising:
   a processing system configured to:
      determine one or more state variables of a neuron model used by an artificial neuron, based at least in part on dynamics of the neuron model;
      determine one or more conditions based at least in part on the state variables; and
      adjust the dynamics based at least in part on the conditions; and
   a memory coupled to the processing system.

20. The apparatus of claim 19, wherein the one or more state variables comprise a recovery variable of the artificial neuron.

21. The apparatus of claim 20, wherein the conditions comprise a value of the recovery variable being below a threshold.

22. The apparatus of claim 21, wherein the processing system is configured to adjust the dynamics by slowing the dynamics of the neuron model if the value of the recovery variable is below the threshold.

23. The apparatus of claim 22, wherein slowing the dynamics comprises increasing a time constant of a leaky-integrate-and-fire (LIF) regime of the neuron model.

24. The apparatus of claim 20, wherein the conditions comprise a value of the recovery variable being above a threshold.

25. The apparatus of claim 24, wherein the processing system is configured to adjust the dynamics by accelerating the dynamics of the neuron model if the value of the recovery variable is above the threshold.

26. The apparatus of claim 25, wherein accelerating the dynamics comprises decreasing a time constant of a leaky-integrate-and-fire (LIF) regime of the neuron model.

27. The apparatus of claim 19, wherein the processing system is configured to adjust the dynamics by adjusting a time constant in the neuron model used by the artificial neuron.

28. The apparatus of claim 27, wherein an absolute value of the time constant is decreased to increase a firing rate of the artificial neuron and wherein the absolute value of the time constant is increased to decrease the firing rate of the artificial neuron.

29. The apparatus of claim 19, wherein the processing system is configured to adjust the dynamics of the neuron model based at least in part on at least one of intervals, events, or a path of the state variables between the events.

30. The apparatus of claim 19, wherein the neuron model comprises a neuron model having two or more state variables, wherein one of the two or more state variables comprises a recovery variable.

31. The apparatus of claim 30, wherein the neuron model comprises at least one of an Izhikevich simple model, an exponential-integrate-and-fire (EIF) model, a FitzHugh-Nagumo model, a quartic model, or a Hunzinger Cold model.

32. The apparatus of claim 19, wherein the processing system is configured to determine the one or more conditions based at least in part on spiking events of the artificial neuron.

33. The apparatus of claim 19, wherein the processing system is configured to determine the one or more conditions by periodically determining the one or more conditions at an interval.

34. The apparatus of claim 33, wherein the one or more state variables comprise a membrane potential of the artificial neuron, wherein the one or more conditions comprise a number of spikes of the membrane potential in the interval being above a threshold, and wherein the processing system is configured to adjust the dynamics by slowing the dynamics of the neuron model if the number of spikes in the interval is above the threshold.

35. The apparatus of claim 33, wherein the one or more state variables comprise a membrane potential of the artificial neuron, wherein the one or more conditions comprise a number of spikes of the membrane potential in the interval being below a threshold, and wherein the processing system is configured to adjust the dynamics by increasing the dynamics of the neuron model if the number of spikes in the interval is below the threshold.

36. The apparatus of claim 19, wherein the artificial nervous system comprises a spiking neural network.

37. An apparatus for implementing homeostasis of an artificial nervous system, comprising:
    means for determining one or more state variables of a neuron model used by an artificial neuron, based at least in part on dynamics of the neuron model;
    means for determining one or more conditions based at least in part on the state variables; and
    means for adjusting the dynamics based at least in part on the conditions.

38. A computer program product for implementing homeostasis of an artificial nervous system, comprising a non-transitory computer-readable medium having instructions executable to:
    determine one or more state variables of a neuron model used by an artificial neuron, based at least in part on dynamics of the neuron model;
    determine one or more conditions based at least in part on the state variables; and
    adjust the dynamics based at least in part on the conditions.

* * * * *